US012748943B2

(12) United States Patent
Zhang et al.

(10) Patent No.: US 12,748,943 B2
(45) Date of Patent: Sep. 29, 2026

(54) AVERAGE POWER ESTIMATION USING GRAPH NEURAL NETWORKS

(71) Applicant: NVIDIA Corp., Santa Clara, CA (US)

(72) Inventors: Yanqing Zhang, Santa Clara, CA (US); Haoxing Ren, Austin, TX (US); Brucek Khailany, Austin, TX (US)

(73) Assignee: NVIDIA Corp., Santa Clara, CA (US)

( * ) Notice: Subject to any disclaimer, the term of this patent is extended or adjusted under 35 U.S.C. 154(b) by 1178 days.

(21) Appl. No.: 16/992,354

(22) Filed: Aug. 13, 2020

(65) Prior Publication Data

US 2021/0158155 A1 May 27, 2021

Related U.S. Application Data

(60) Provisional application No. 62/940,604, filed on Nov. 26, 2019.

(51) Int. Cl.

| | |
|---|---|
| ***G06N 3/04*** | (2023.01) |
| ***G06F 11/30*** | (2006.01) |
| ***G06F 11/34*** | (2006.01) |
| ***G06F 18/20*** | (2023.01) |
| ***G06N 3/048*** | (2023.01) |
| ***G06N 3/08*** | (2023.01) |
| ***G06N 5/046*** | (2023.01) |

(52) U.S. Cl.

CPC ........... *G06N 3/04* (2013.01); *G06F 11/3062* (2013.01); *G06F 11/348* (2013.01); *G06F 18/29* (2023.01); *G06N 3/048* (2023.01); *G06N 3/08* (2013.01); *G06N 5/046* (2013.01)

(58) Field of Classification Search

CPC .... G06F 18/29; G06F 11/3062; G06F 11/348; G06N 3/048; G06N 3/08; G06N 3/04; G06N 5/046

See application file for complete search history.

(56) References Cited

U.S. PATENT DOCUMENTS 8,407,653 B1 * 3/2013 Schumacher ........... G06F 30/33 716/132
11,475,293 B1 * 10/2022 Pan ........................ G06N 20/20

OTHER PUBLICATIONS

Ramesh, S. R., and R. Jayaparvathy. "Toggle rate estimation and glitch analysis on logic circuits." 2017 IEEE International Workshop on Integrated Power Packaging (IWIPP). IEEE, 2017. (Year: 2017).*

Schumacher, Paul, et al. "Fast RTL power estimation for FPGA designs." 2011 21st International Conference on Field Programmable Logic and Applications. IEEE, 2011. (Year: 2011).*

Huzefa Mehta, "Accurate Estimation of Combinational Circuit Activity," 32nd Design Automation Conference, San Francisco, CA, 1995, pp. 618-622.

Kipf, Thomas & Welling, Max. "Semi-Supervised Classification with Graph Convolutional Networks." Published as a conference paper at ICLR 2017.

(Continued)

*Primary Examiner* — Markus A. Vasquez

(74) *Attorney, Agent, or Firm* — Carnelian Law, LLC

(57) ABSTRACT

A graph neural network for average power estimation of netlists is trained with register toggle rates over a power window from an RTL simulation and gate level netlists as input features. Combinational gate toggle rates are applied as labels. The trained graph neural network is then applied to infer combinational gate toggle rates over a different power window of interest and/or different netlist.

12 Claims, 19 Drawing Sheets

(56) References Cited

OTHER PUBLICATIONS

M. Nourani, S. Nazarian and A. Afzali-Kusha, “A parallel algorithm for power estimation at gate level,” The 2002 45th Midwest Symposium on Circuits and Systems, 2002. MWSCAS-2002., Tulsa, OK, USA, 2002, pp. 1-511.

Wang, Minjie et al. “Deep Graph Library: Towards Efficient and Scalable Deep Learning on Graphs.” ArXiv abs/1909.01315 (2019).

Zhou, Yuan & Ren, Haoxing & Zhang, Yanqing & Keller, Ben & Khallany, Brucek & Zhang, Zhiru. “ PRIMAL: Power Inference using Machine Learning.” The 56th Annual Design Automation Conference Jun. 2019.

* cited by examiner

AVERAGE POWER ESTIMATION USING GRAPH NEURAL NETWORKS

CROSS REFERENCE TO RELATED APPLICATIONS

This application claims priority and benefit under 35 USC 119(e) to U.S. Application Ser. No. 62/940,604, titled "AVERAGE POWER ESTIMATION USING GRAPH NEURAL NETWORKS", filed on Nov. 26, 2019, the contents of which are incorporated herein by reference in their entirety.

BACKGROUND

Average power analysis is important to digital circuit hardware development flows. The traditional method of average power estimate entails RTL to gate synthesis, gate level logic simulation to attain per gate toggle rates, and power calculation using commercial EDA tools which is slow and incurs long turnaround time. "EDA" refers to (Electronic Design Automation), techniques to design, lay out, verify and simulate the performance of electronic circuits on a chip or printed circuit board. "RTL" refers to register-transfer level (RTL), which models a synchronous digital circuit in terms of the flow of digital signals (data) between hardware registers, and the logical operations performed on those signals. This leads to restrictions in productivity during development, which is often bottlenecked by gate level simulation runtime.

Therefore, to enable fast, accurate, and transferable average power estimation, we propose a supervised learning-based switching activity estimator for average power inference that obviates the need for gate level simulation.

Past efforts have fallen short in at least one of the three criteria of being fast, accurate, and transferable (the ability to estimate average power for arbitrarily synthesized Boolean logic). GPU accelerated simulation is still not fast enough, probabilistic switching activity analysis is inaccurate, and modeling the design at above gate level abstractions (so they are not bottlenecked by gate simulation time) comes with a loss of transferability as one model must be made per unique design.

Average power estimation is invoked at various hardware development stages for initial power budget estimation, specific workload power estimation, or to assess if dynamic power reduction optimizations within synthesis or place-and-route tools helped or hurt overall power. Thus, speeding up average power estimation at the cost of small introduced error may greatly benefits design time efficiency and ultimately time-to-market.

Graph neural networks (GNNs) are a neural network architecture for machine learning on graphs, with many important applications such as social networking and scene labeling. Graph neural networks assign node and edge features on a graph and share these features with neighbor nodes through message passing. One popular type of GNN is the graph convolutional network (GCN). GCNs perform message passing in three steps: message sending, message reduction, and node transformation. The final resulting node features then become the output of the graph neural network. The output of each node not only depends on assigned features, but also its connectivity with its neighbors. Thus graph neural networks learn parameters from input feature data as well as structure of the input graph.

BRIEF DESCRIPTION OF THE SEVERAL VIEWS OF THE DRAWINGS

To easily identify the discussion of any particular element or act, the most significant digit or digits in a reference number refer to the FIGURE number in which that element is first introduced.

DETAILED DESCRIPTION

Figure 1:
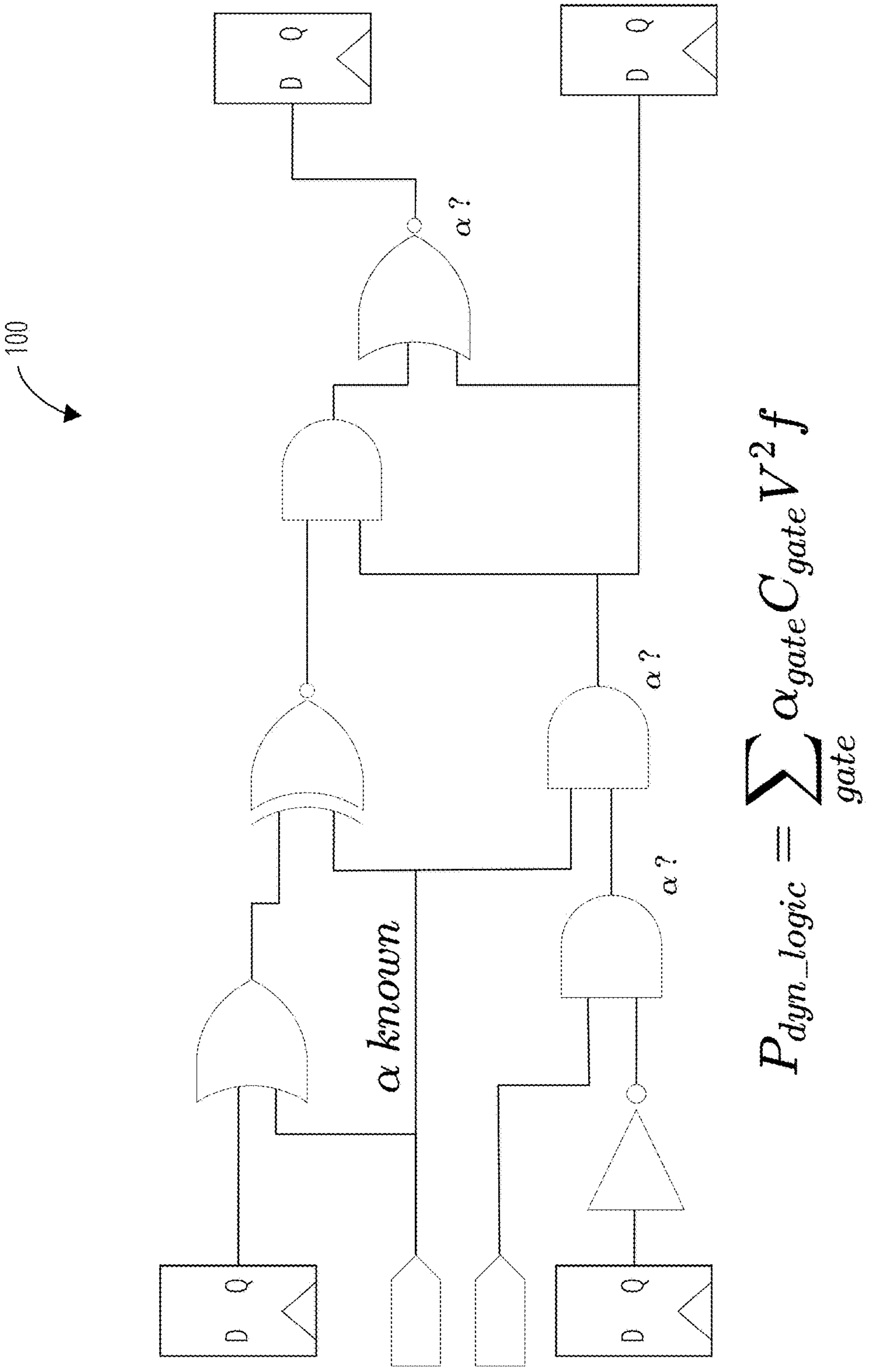
FIG. 1 depicts switching activity estimation 100 in accordance with one embodiment.

Disclosed herein are processes and systems that improve the efficiency of machines that generate control structures to other machines (layout, simulation, routing etc.) during the design and manufacture of complex electronic circuitry. The processes and systems generate outputs faster and with more accuracy than conventional systems and thus decrease the design-to-manufacture cycle for microchip products. For example the control structures based on average power estimation generated using the disclosed processes and systems may be utilized to generate routing, layout, noise suppression, and power supply features of microchips. The disclosed processes and systems are thus improvements to the efficiency and computerization of the inherently technological process of manufacturing microchips.

Applications for average power estimation include initial power budget estimation for a circuit, workload power estimations to understand power across different operation modes of circuits, and assessment of the efficacy of dynamic power reduction optimizations within synthesis or place-and-route tools.

In the disclosed systems a supervised learning-based switching activity estimator utilizes a graph neural network (GNN) to generate average power estimates. The system foregoes the need for gate level simulation. During training, the GNN receives the following inputs:

gate level netlist and corresponding input port and register toggle rate over a power window from simulation ground truth per combinational gate toggle rates from gate level simulation as labels to train against.

The trained GNN model can then be used as a learned switching activity estimator, inferring combinational logic toggle rates from input toggle rate features from RTL simulation (which run much faster than gate level simulation) over a new window of interest for the same or new microchip designs. The inferred toggle rates may be transformed into a format accepted (such as .saif) by commercial power calculation tools to generate the average power estimates. The inference process may utilize traces in the form of average input toggle rates and average register toggle rates for a circuit in a power window.

In one embodiment the GNN model comprises one fully connected layer followed by one graph neural network and two fully connected layers.

The disclosed systems achieve improved performance by foregoing slow gate level simulation. Compared against traditional methods for obtaining average power estimates utilizing gate level simulation, the model may achieve performance improvements on the order of 10-20× for an average power window of, for example, 1000 clock cycles.

The disclosed systems achieve accuracy using a supervised learning approach. Probabilistic switching activity estimation is inaccurate because it does not take into account re-convergence and other gate input signal correlation issues. The disclosed systems learn switching activity based both on the Boolean logic of the gate and signal correlations. Graph neural networks learn not only based on input data but also the structure of the graph. In some cases the systems may achieve an average error of <5.5% while a conventional commercial probabilistic switching activity estimator exhibits an average error of 42%.

The graph neural network model used in the systems is transferable because the netlist/graph is an input to the model. Also during the netlist-to-graph translation process the gate/node and pin/edge features are incorporated into the graph object to characterize the underlying Boolean logic in graph form. In this way the system is enabled to perform switching activity estimation inference on new netlists it has not encountered during training.

The structure of the model may comprise an input layer, one or more output layers, and a graph neural network in the middle. There may be two or more fully connected layers on the output, one of which is a Softmax activation layer, since inferences between zero and one are being performed. In some configurations there may be additional layers either at the input or output. In some configurations there may be more than one graph neural network layer. These graph neural networks may be organized as multiple sequential graph neural networks, and/or may be multimodal (arranged in parallel).

FIG. 1 depicts a switching activity estimation 100 scenario.

Figure 2A:
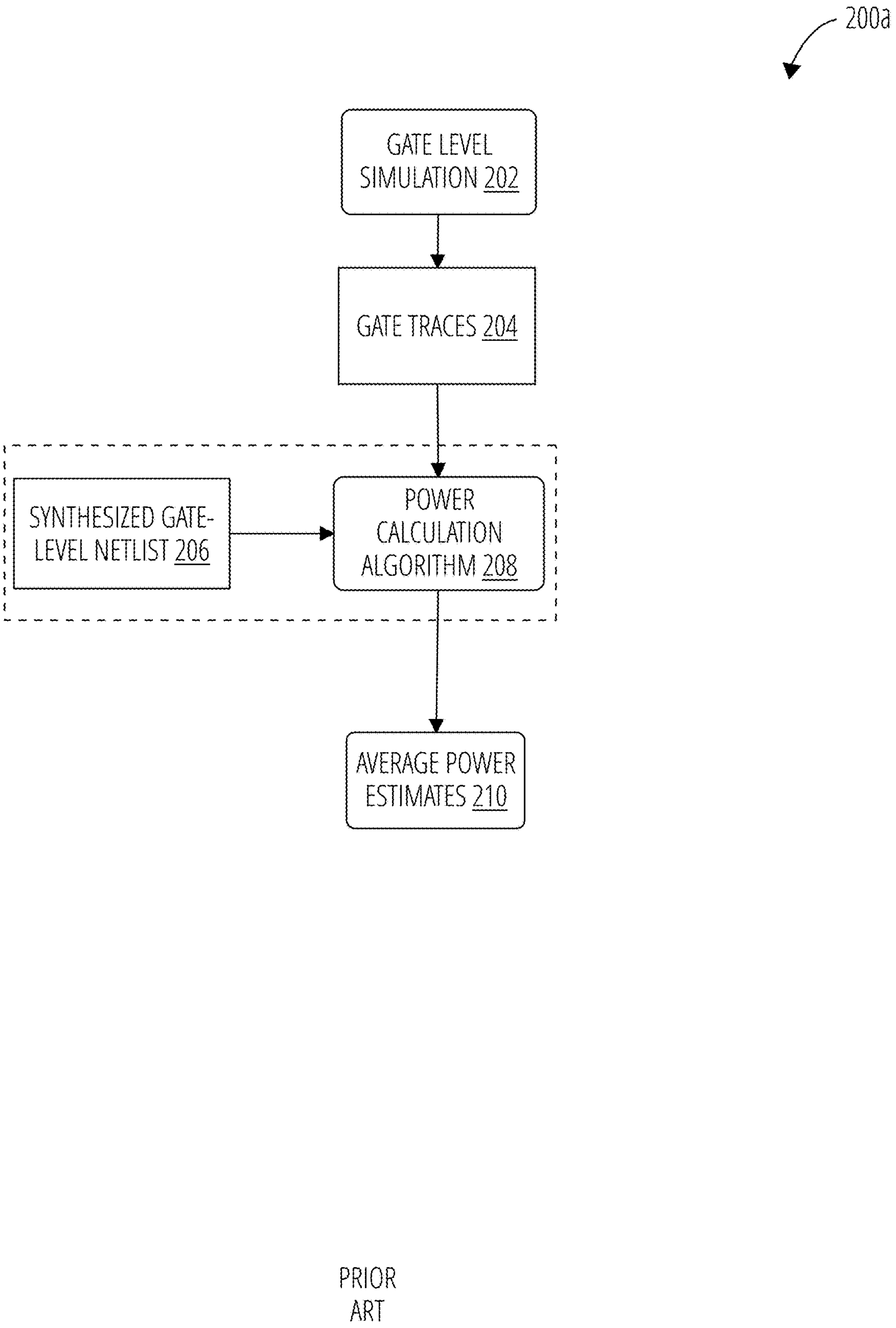
FIG. 2A depicts a conventional average power estimation technique 200*a* in accordance with one embodiment.

FIG. 2A depicts a conventional average power estimation technique 200*a* that may be applied to the switching activity estimation 100. The conventional average power estimation technique 200*a* comprises a gate level simulation 202 from which gate traces 204 are extracted, a synthesized gate-level netlist 206, and a power calculation algorithm 208 that transforms the gate traces 204 and synthesized gate-level netlist 206 into average power estimates 210. In cases where only average power consumption needs to be determined, it is inefficient to go through per-cycle gate simulation because only toggle rates need to be measured. While input port and register traces are known after RTL simulation (and thus sequential element average power), the combinational gate toggle rates are not known immediately after gate synthesis. The conventional average power estimation technique 200*a* is thus accurate but slow.

Sequential elements are logic that is operated on the clock cycle and may be referred to as clocked elements. An example of these elements are registers, flips-flops, latches, SRAM, and so on. Combination logic transforms its inputs to outputs independently of a clock signal. Examples of combinational elements are Boolean logic gates.

The traces for the input port and registers are per clock cycle waveforms associated with the input ports and registers. These waveforms identify signals on the input port and/or register over time. Traces may also be obtained for sequential elements such as flip-flops or latches.

Figure 2B:
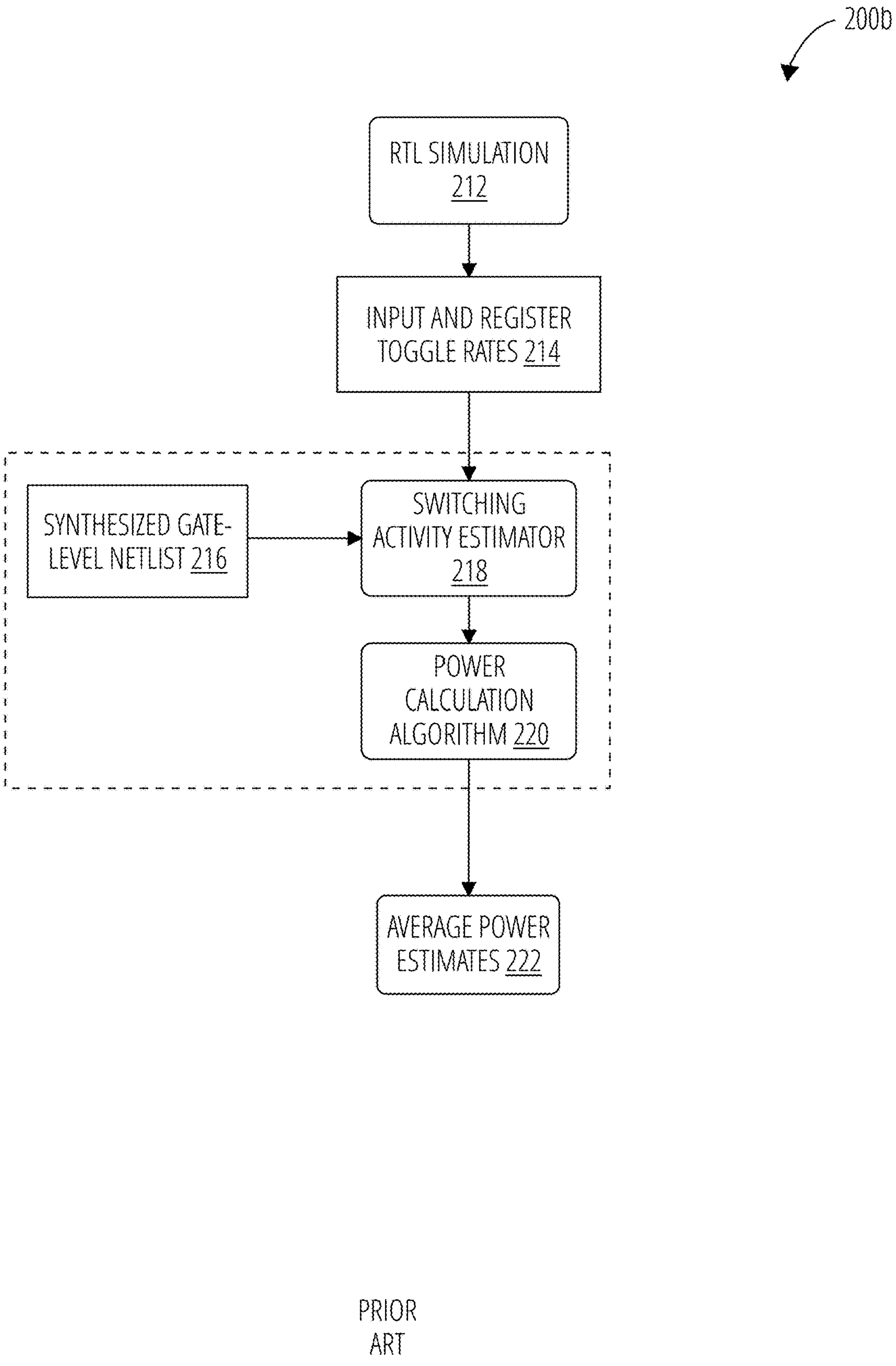
FIG. 2B depicts a conventional average power estimation technique 200*a* in accordance with one embodiment.

FIG. 2B depicts a conventional average power estimation technique 200*b* that may be applied to the switching activity estimation 100. The conventional average power estimation technique 200*b* comprises an RTL simulation 212 from which input and register toggle rates 214 are extracted, a synthesized gate-level netlist 216, and a switching activity estimator 218 and power calculation algorithm 220 that transform the input and register toggle rates 214 and synthesized gate-level netlist 216 into average power estimates 222. The conventional average power estimation technique 200*b* is faster than the conventional average power estimation technique 200*a* but less accurate. To improve accuracy the gates with re-convergent inputs may be assigned tags. The Boolean logic expression of these gates may be recorded with regards to primary inputs instead of propagated toggle rates. One drawback this approach has is the potentially very large memory requirements for recording Boolean logic expressions, which scales with logic depth and number of primary inputs.

Figure 2C:
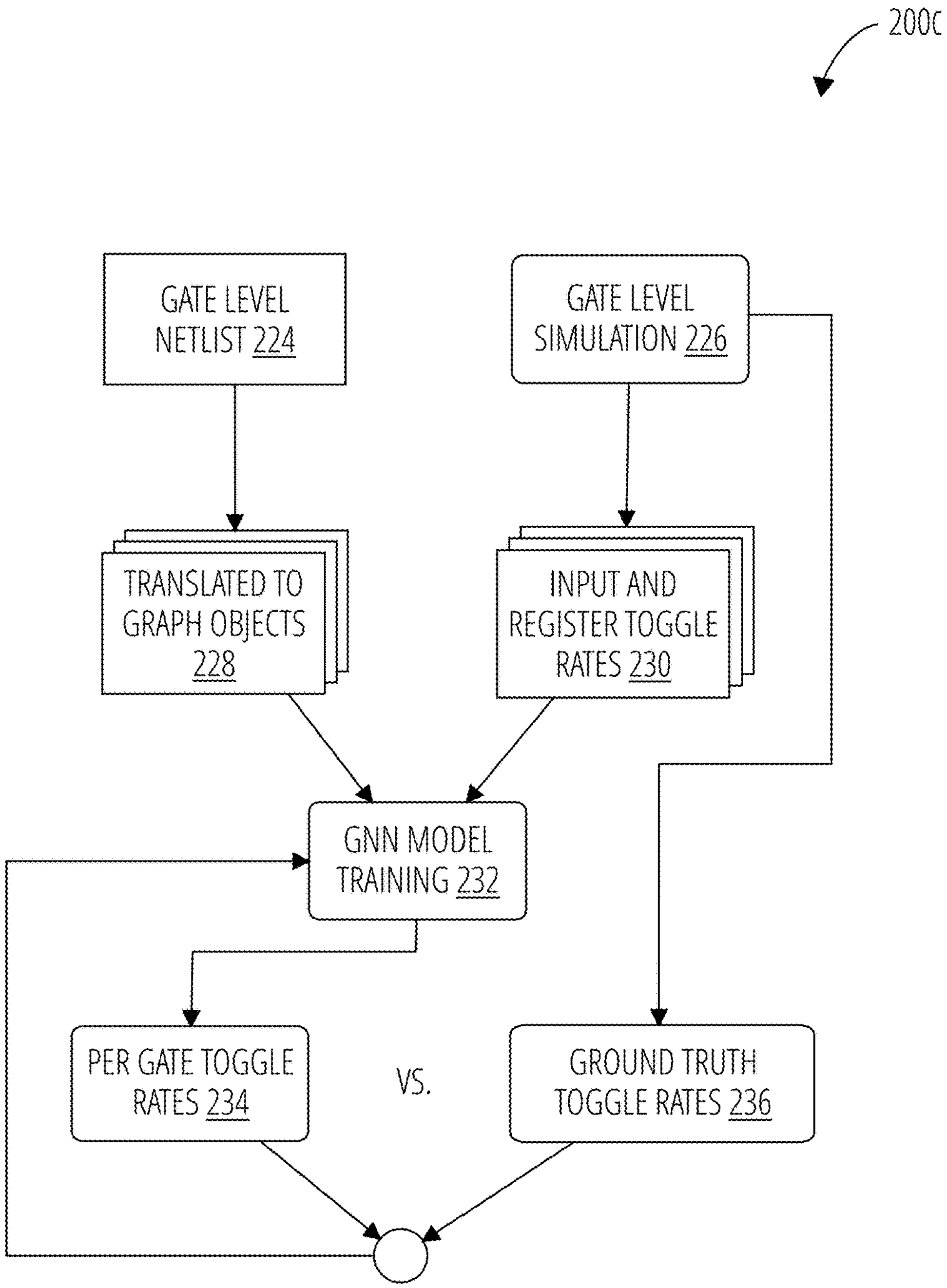
FIG. 2C illustrates an aspect of the subject matter in accordance with one embodiment.

FIG. 2C depicts a training method 200*c* for graph neural network inference of power estimation. The training method 200*c* comprises a gate level simulation 226 from which input and register toggle rates 230 are extracted. These and a gate level netlist 224 are translated to graph objects 228 that are received by the GNN model training 232. The GNN model training 232 generates per gate toggle rates 234. The ground truth toggle rates 236 from the gate level simulation 226 are then compared to the per gate toggle rates 234. In the training method 200*c*, the gate level netlist 224 and corresponding input port and corresponding input and register toggle rates 230 are input features from a power window of the gate level simulation 226. The ground truth toggle rates 236 per logic gate from the gate level simulation 226 are utilized as labels to train against.

Figure 2D:
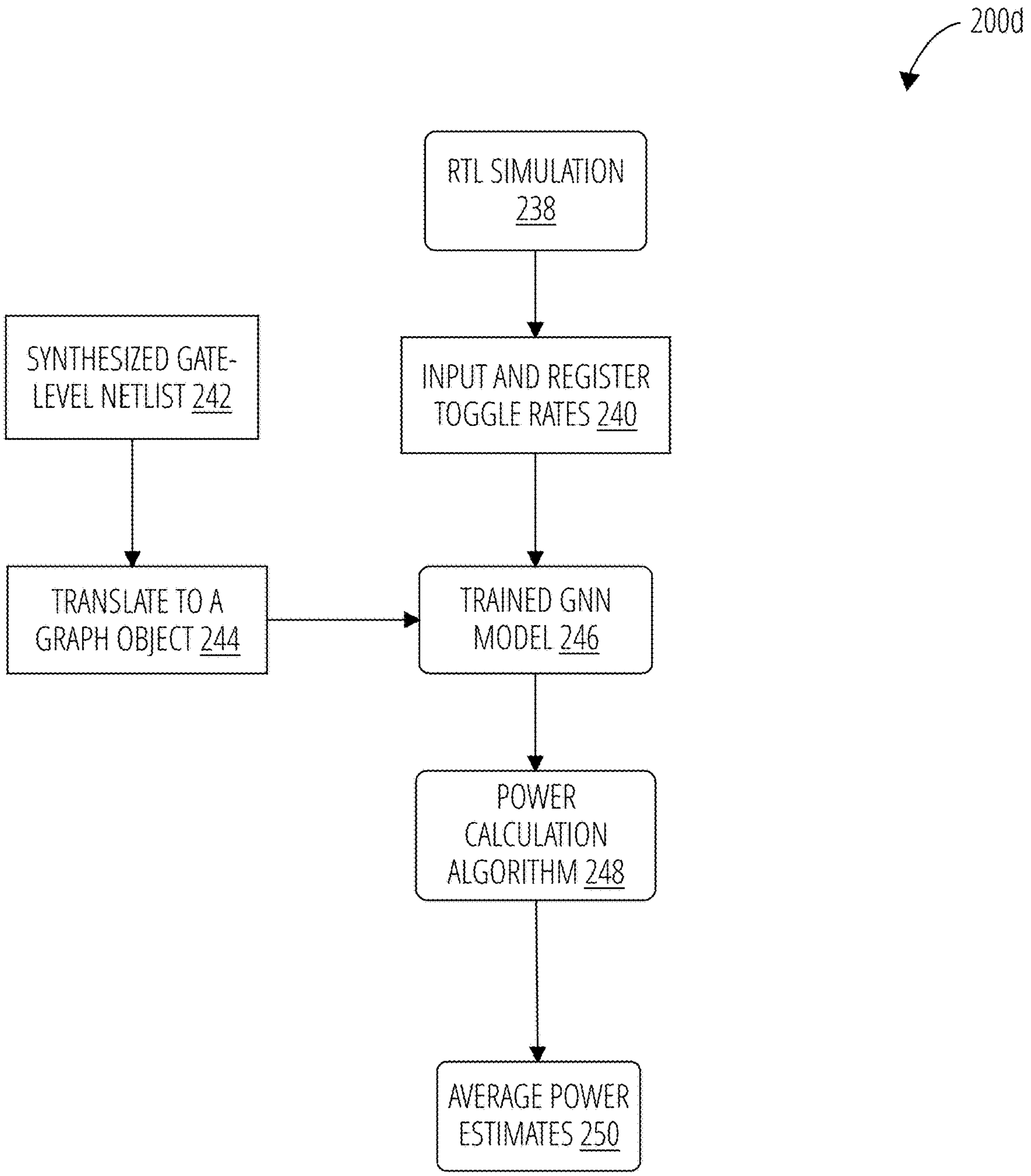
FIG. 2D illustrates an aspect of the subject matter in accordance with one embodiment.

FIG. 2D depicts inference method 200*d* for graph neural network inference of power estimation. The inference method 200*d* comprises an RTL simulation 238 from which input and register toggle rates 240 are extracted, a synthesized gate-level netlist 242 to translate to a graph object 244, a trained GNN model 246 that receives the input and register toggle rates 240 and the graph generated from the synthesized gate-level netlist 242 and generates toggle rates for use by a power calculation algorithm 248 to calculate average power estimates 250.

The trained GNN model 246 can then be operated as a learned Switching Activity Estimator (SAE), inferring logic gate toggle rates from input toggle rate features over a new power window of interest for the same or different circuits. In manners understood in the art, the inferred toggle rates may then be translated into industry-standard formats such as the Switching Activity Interchange Format (.saif) format for average power analysis by commercial tools over the window of interest.

Figure 3:
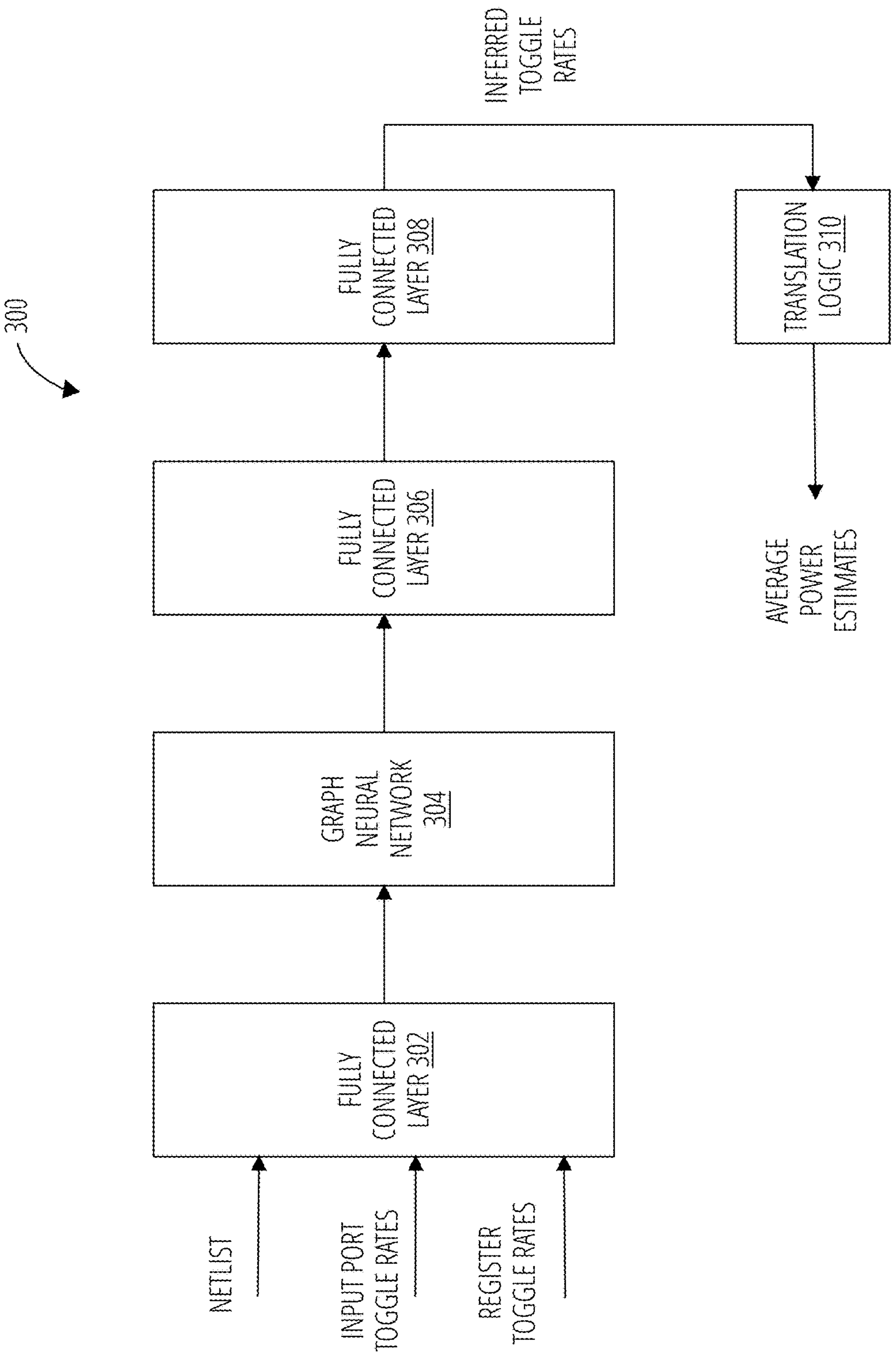
FIG. 3 depicts an average power estimation system 300 in accordance with one embodiment.

FIG. 3 depicts an average power estimation system 300 in one embodiment. The average power estimation system 300 comprises a fully connected layer 302 receiving a netlist and known input port and register toggle rates, followed by a graph neural network 304, fully connected layer 306, and fully connected layer 308. The inferred combinational gate toggle rates output by the neural network are converted to average power estimates by translation logic 310.

The translation logic 310 in one embodiment performs matrix multiplication with the inferred toggle rates multiplied by a normalized constant for each gate to give the average power of that gate. The normalized constant may be the power of the gate assuming that the gate is constantly switching. These values may be stored in a table, such as a look up table. In some embodiments the normalized 'constant' may vary depending upon the load drive ratio, input slew, low pass and attack pass for the gate. The normalized constant may be multiplied by the inferred toggle rates to generate the average power of each gate. The sum of the average power of each gate may then represent the total average power. The total average power is a weighted multiplied sum similar to a lookup table-based dot product.

Figure 4:
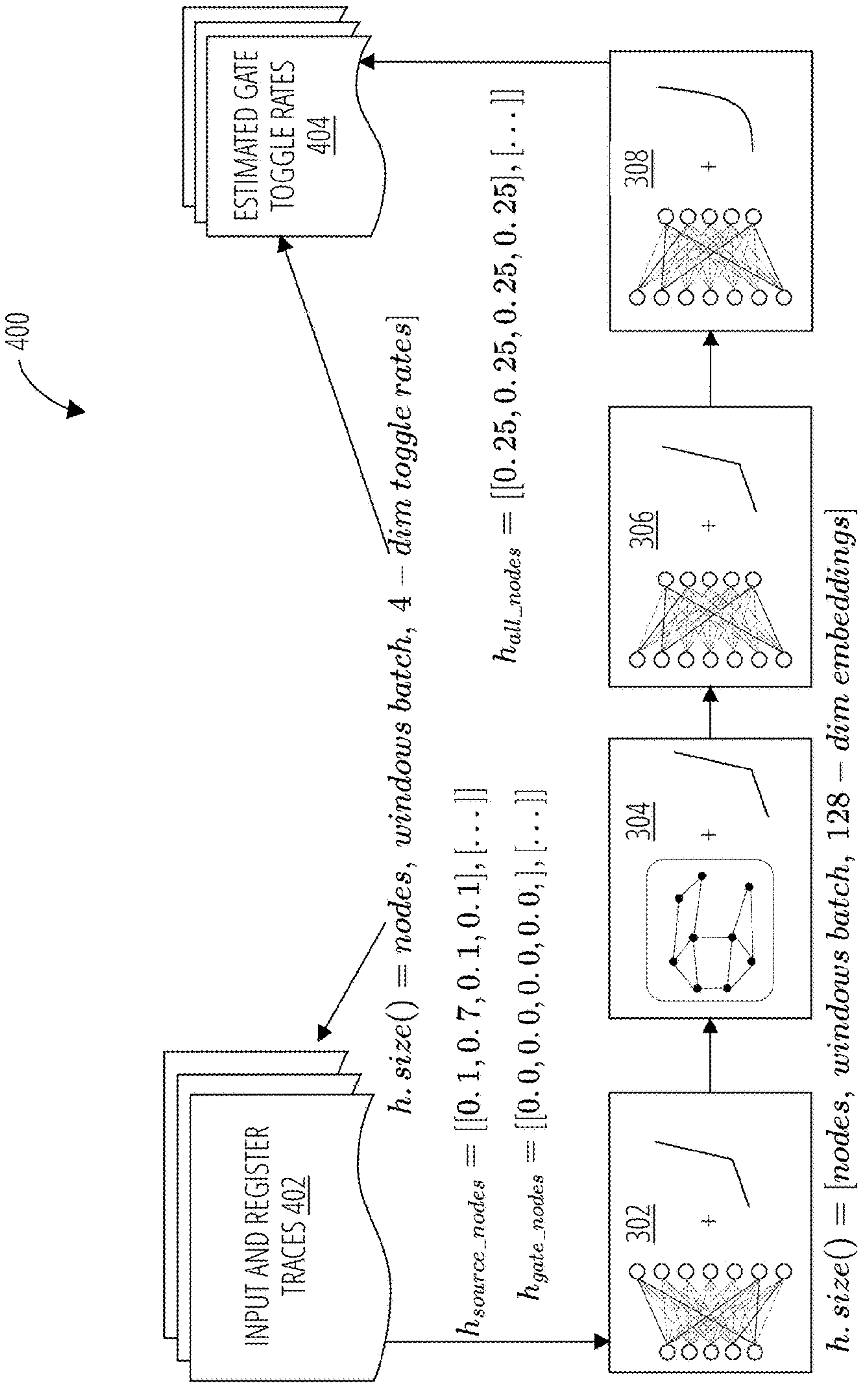
FIG. 4 depicts a graph neural network architecture 400 in accordance with one embodiment.

FIG. 4 depicts a graph neural network architecture 400 in one embodiment. In this embodiment arrays are three (or more) dimensional to enable multiple power windows to be batched during training and inference (average power estimation). The first dimension comprises graph nodes in which each node represents a gate, followed by a dimension for one or more power windows, followed by a dimension for toggle rate characteristics such as the probability of each node to switch high or low or remain low or high. The windows batch process is for instances such as when there are several power windows with different clock cycle numbers. For example, one of the power windows may have a clock cycle number zero to 100. Another power window may have clock cycle numbers between 2000 to 3000. Dimensional toggle rates from the input ports during each power window are provided in the third dimension.

For example inferred toggle rates for combinational gates across two power windows may be calculated in parallel in one forward inference pass through the model to generate inferences for both. These inferences may be applied to generate two sets of average powers, one for each power window, or an average power of the combined power windows. In other words after output of the inferences, the two estimates may be combined (e.g., averaged) or kept separate.

The inputs to the model may thus be a three dimensional vector with the third dimension being of size four dimensionality. In this case the four values representing probabilistic toggle rate behavior are embedded in a three-dimensional h size vector.

The graph neural network architecture 400 in the depicted example comprises one fully connected layer 302 followed by a graph neural network 304 and then two fully connected layers (fully connected layer 306 and fully connected layer 308). The fully connected layer 302 maps the low (4) dimension input toggle rate features to a higher dimension space (e.g., 128 dimensions). The dimensions represent different switching activity embeddings. In essence, the function of the graph neural network 304 is to learn the complex, non-linear relationship between input toggle rates, Boolean logic, netlist structure, and output toggle rates.

Figure 5:
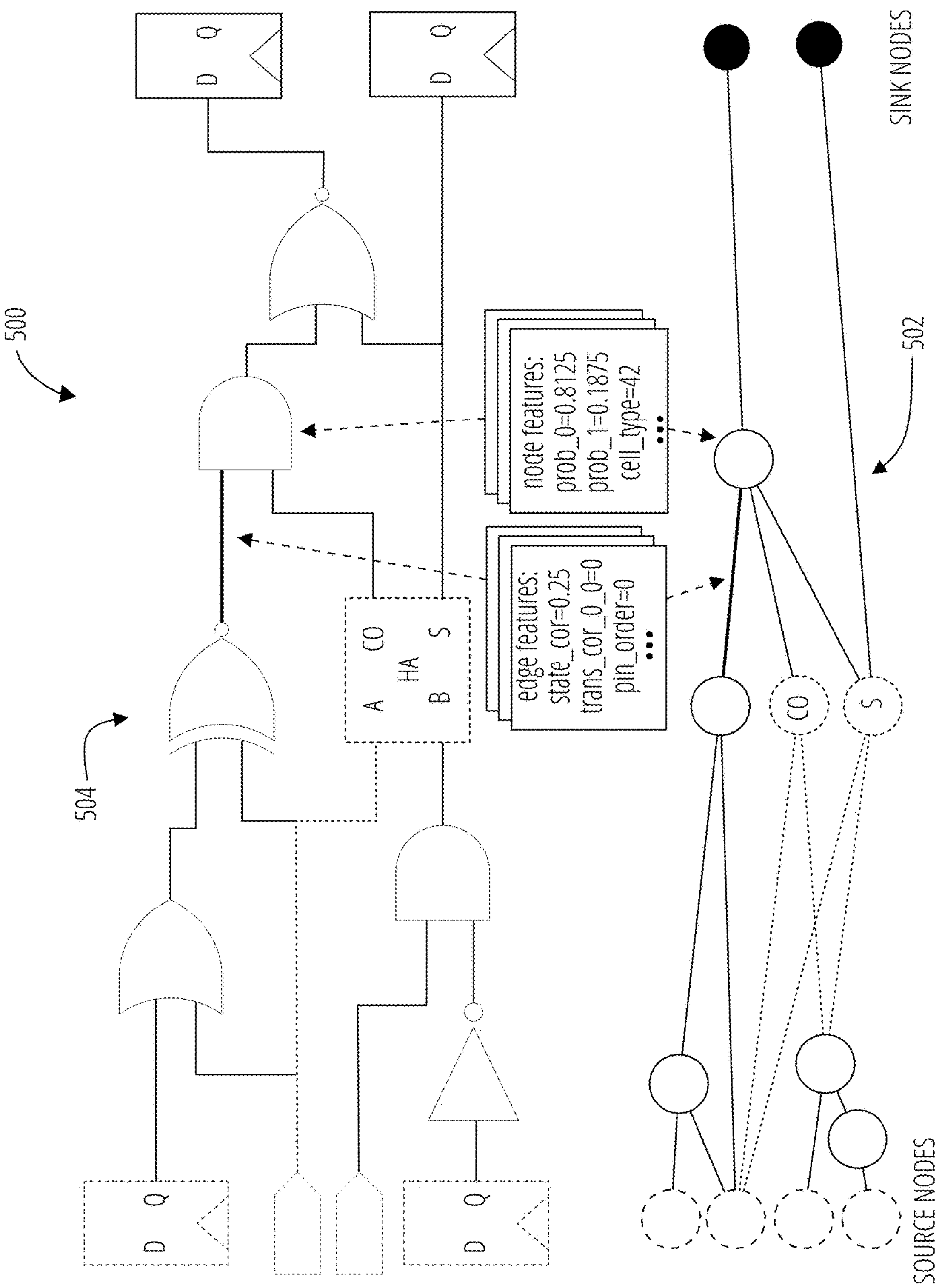
FIG. 5 depicts a gate-level netlist to node embedding transformation process 500 in accordance with one embodiment.

FIG. 5 depicts a gate-level netlist to node embedding transformation process 500 in one embodiment. The gate-level netlist to node embedding transformation process 500 transforms a gate-level netlist 504 into a graph 502. Multiple output gates are automatically split into multiple nodes. The gate-level netlist to node embedding transformation process 500 also records node and edge features.

Figure 6:
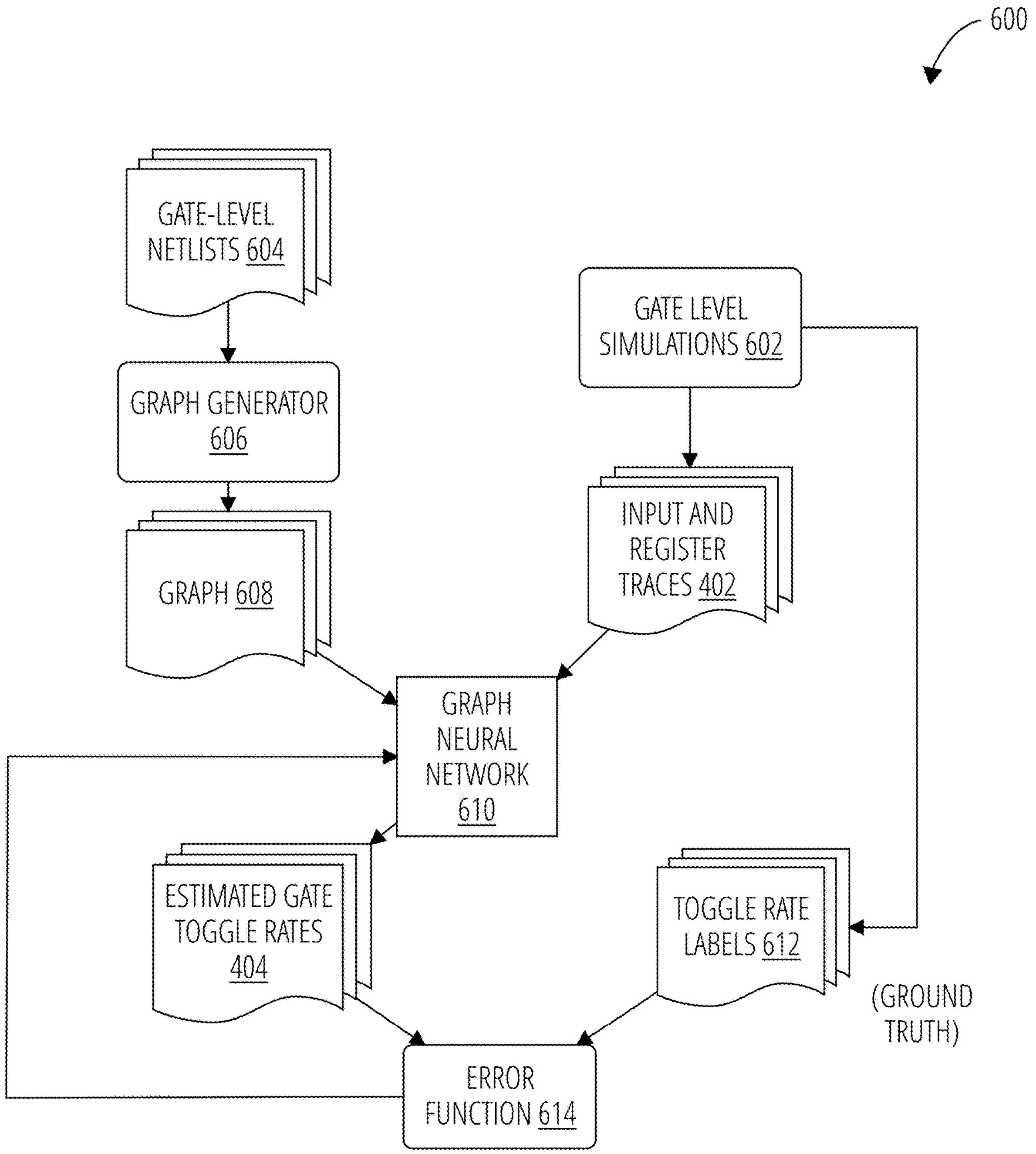
FIG. 6 depicts a graph neural network training technique 600 in accordance with one embodiment.

FIG. 6 depicts a graph neural network training technique 600 in one embodiment. Gate-level netlists 604 are converted to a graph 608 by a graph generator 606, and input and register traces 402 are extracted from gate level simulations 602. The graph 608 and input and register traces 402 are input to a graph neural network 610. The graph neural network 610 generates estimated gate toggle rates 404. The estimated gate toggle rates 404 and ground truth toggle rate labels 612 from the gate level simulations 602 are applied to an error function 614 that feeds back training adjustments to the graph neural network 610.

The graph generator 606 is utilized to translate gate-level netlists into graph representations. The gates are mapped to graph nodes, and output-pin-to-net-to-input-pin connections are mapped into graph edges. The translation process may automatically split multi-output circuits, such as adders, into two separate nodes. Circuit components are split into one node per output of the circuit.

The generated graph comprises a one-to-one correspondence between a circuit element output and graph nodes, such that all the net connections become edge connections in the graph. For instance, in the case of a half-adder, there are two outputs—carry out and sum. The half-adder, which is represented as one component in the netlist, becomes two nodes in the graph because of its two outputs. The generated graph includes embeddings that apply features of the netlist for a connection and embed those into an edge of the graph. Likewise, gate features from the netlist are embedded in nodes of the graph. Probability features are also included in the generated graph. Because these are inherent characteristics of logic cells that are found in the netlist, probabilities such as if that gate is switching on or off, or if the output is a zero or one, are also embedded in the graph.

Summary of Local Node/Edge Features

TABLE 1

| Type | Description, (Count) | NAND2/A Pin Example Value |
|---|---|---|
| Node | Intrinsic state probabilities (2) | prob__0 = 0.25 |
| Node | Intrinsitic transition probability (1) | prob__sw = 0.1875 |
| Node | Boolean tag if gate is inverting logic (1) | inv = 1 |
| Edge | Pin state to output state correlation (1) | state__cor = 0.5 |
| Edge | Pin transition to output pin transition correlations (16) | trans__cor__0__to__1 = 1.0 |

Table 1 depicts an example of how graph connectivity information and local node and edge features that comprise characteristics of each gate and net are embedded by the graph generation process in one embodiment.

Figure 7:
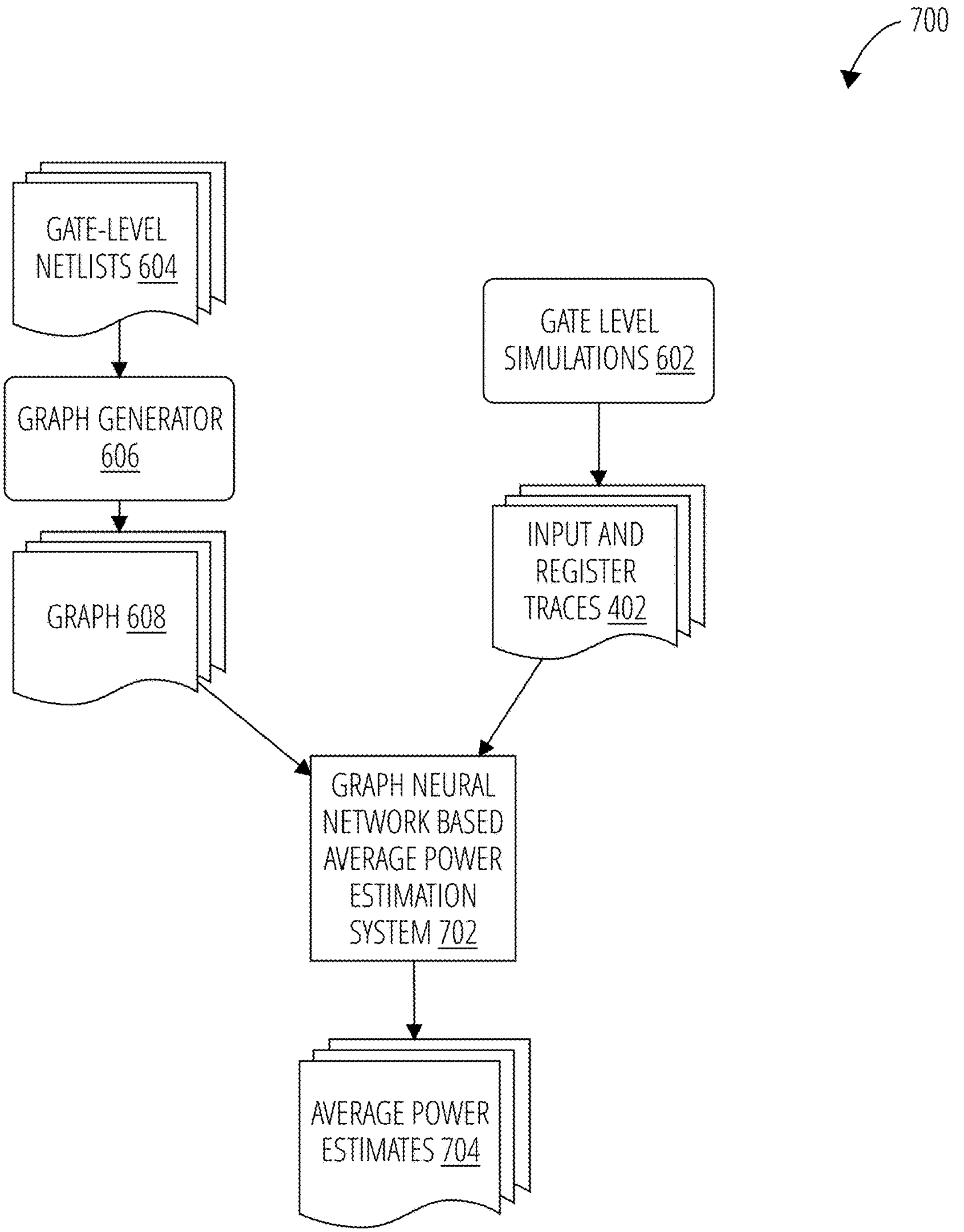
FIG. 7 depicts a graph neural network average power estimation technique 700 in accordance with one embodiment.

FIG. 7 depicts a graph neural network average power estimation technique 700 in one embodiment. The graph 608 and input and register traces 402 are input to a graph neural network based average power estimation system 702 (such as the average power estimation system 300 depicted in FIG. 3) to generate average power estimates 704.

Input features to the average power estimation system 300 include the toggle rates of input ports and register outputs, which may be extracted from RTL simulation during inference, and/or from gate level simulation during training. The toggle rate information may be encoded into arrays with four dimensions representing {probability to stay low, probability to stay high, probability to switch high to low, probability to switch low to high} across the training power window.

The encoded features are then mapped to a high dimension and propagated through the graph neural network as high dimensional embeddings. By mapping the features to a higher dimension, dense feature vectors are utilized to create a sparse vector representing many switching states that is then propagated to the next layer of the graph neural network.

In an example, encoded features have four dimensions that describe four ways of switching. However, there are many more ways to describe switching situations/states. These may be represented in higher dimensions. The higher dimensionality provides neural networks with greater expressive precision because there are more states for evaluation by more neurons. These higher dimension switching states may be determined by calculating a non-linear transfer function from the input to the output of the layers. In one example, this transfer function may determine that there is a two input AND gate and that each of the inputs have a toggle rate of 0.5. However, the effective toggle rate of the AND gate is not necessarily 0.25 if the two inputs are 0.5. It depends on the correlation of the signal waveforms at the input ports, and there can be many different correlations of the input ports. By mapping the basic switching features of the AND gate to a higher dimension the neural network is able to represent many different possible input correlations.

The gate-level netlists 604 are converted into a graph object. Specifically the gates of the gate-level netlists 604 are transformed into nodes of the graph 608 and the output-pin-to-net-to-input-pin connections are transformed into edges of the graph 608. The graph generator 606 automatically splits multiple output gates, such as adders, into separate nodes, as described previously. The graph generator 606 may determine to split a gate if it has more than one output, where each output corresponds to a node.

In addition to retaining connectivity information, the graph generator 606 records local node and edge features that describe characteristics based from the Boolean expression of each gate and connection. Node features include gate intrinsic state probabilities, intrinsic transition probabilities, and a Boolean value tagging the gate as inverting logic or not. Edge features include input pin state to output state correlations, and input pin transition to output pin transition correlations. When the graph neural network 610 receives the graph 608 as input, it uses these local edge and node features as extra dimensions during the embedding transformation phases as part of its learning. See for example the gate-level netlist to node embedding transformation process 500 depicted in FIG. 5.

Figure 8A:
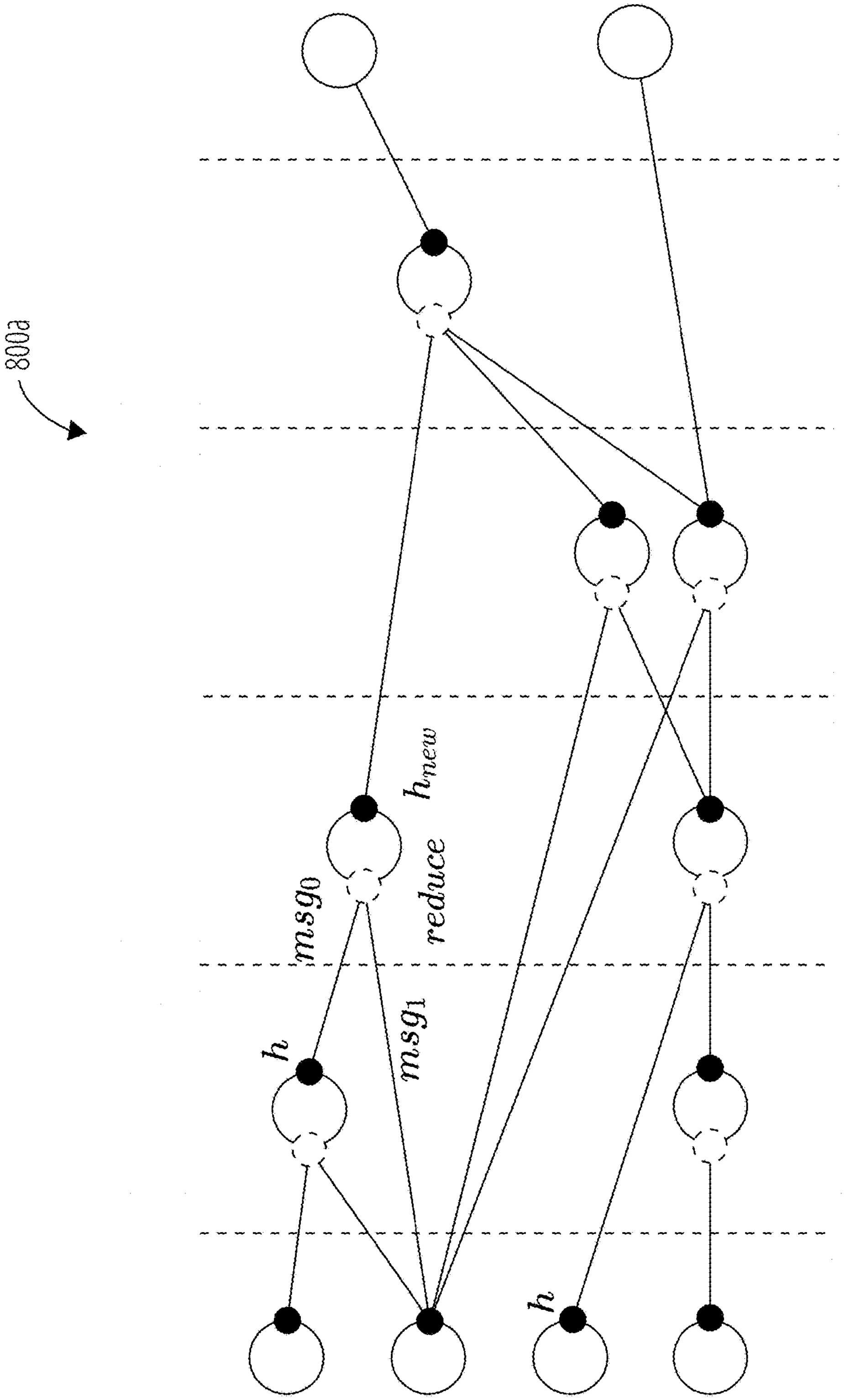
FIG. 8A depicts graph neural network messaging process 800*a* in accordance with one embodiment.

FIG. 8A depicts a graph neural network messaging process 800*a* in one embodiment.

Figure 8B:
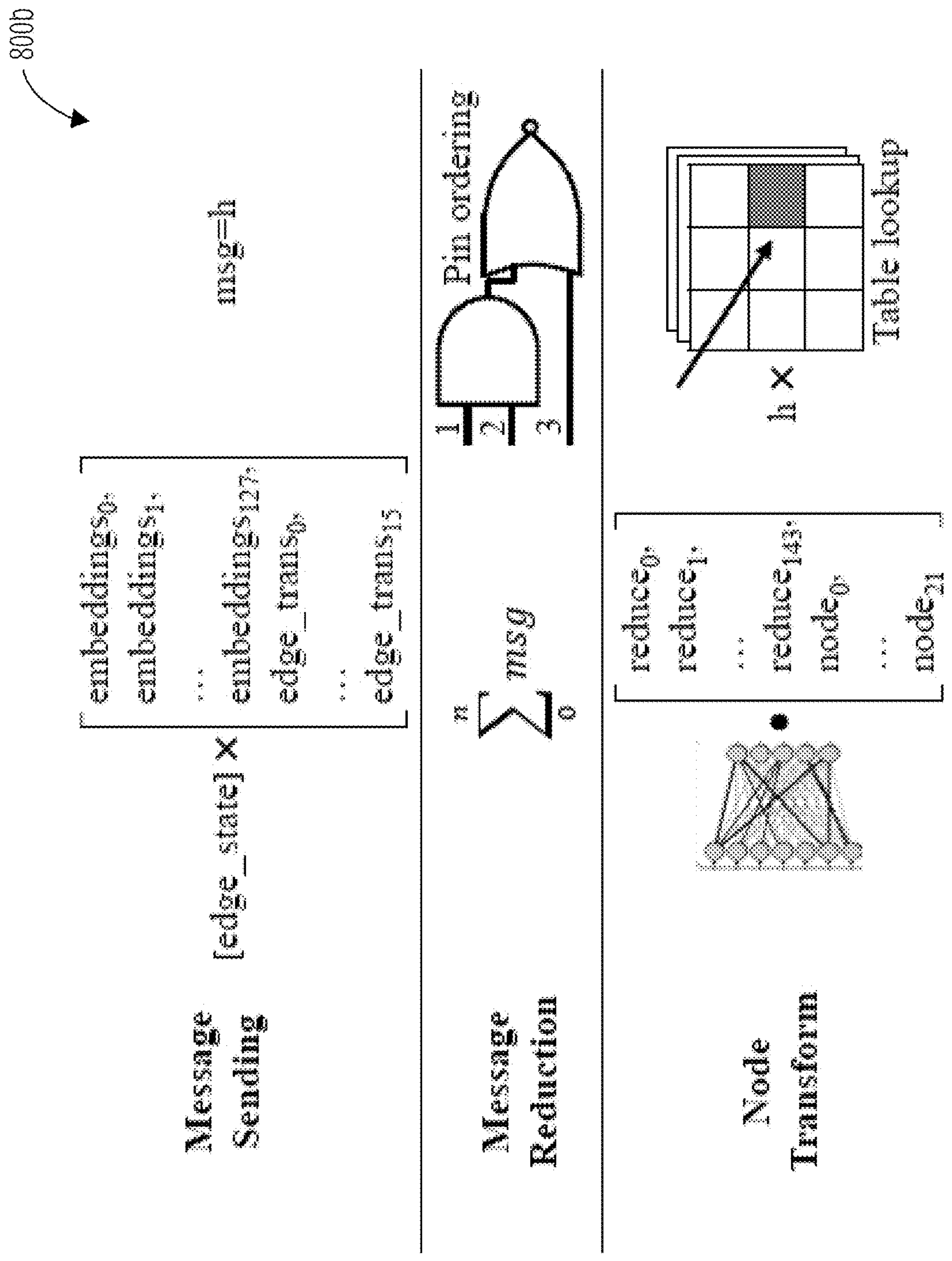
FIG. 8B depicts a Table II 800*b* for message passing in accordance with one embodiment.

Referring to Table II 800*b* in FIG. 8B, message sending concatenates a predecessor node's embeddings with local edge transition features before element-wise multiplying with local edge state features. Message sending is the propagation of the signals between layers inside of the model. Second, message reduction sums the incoming messages. Third, the node transform function concatenates the reduced message with local node features before passing through a fully connected layer within the graph neural network 304. In this way, the calculated embeddings on each node contain both information from predecessor nodes and local node features. Messages are passed from first gate/node stage to last in a levelized manner.

Table II 800*b* has columns representing a graphical neural network implementation and a baseline implementation. The baseline implementation describes switching activity estimation based on assuming the signals are uncorrelated. The graph neural network implementation is described in the middle column of Table II 800*b*. In the GNN there are nodes and there are edges and each node and each edge in the graph starts off with some known features. Learning by the GNN is performed as these nodes and edges share messages amongst themselves.

In this graph neural network example, the rules of message sending is to split that process into three steps. The first step is to send the message, the second step is to reduce the message, and the third step is to then do a transformation on the received message. A description of these functions may be found in Table 3 below. The GNN has multiple stages which are equal to the logic stages in the original netlist, such that each node has predecessors nodes (nodes providing inputs to it). This organization of predecessor nodes forms a levelized representation of the netlist. The rule for message sending involve each node's predecessors communicating embeddings to their downstream nodes, such that each message from a node's predecessor is weighted and that weight is equal to the original gate's logic weight. These logic weights may be from the original netlist. For example, if there is a two input AND gate and each of the pin's logic weight is 0.5, then there are two pins each with a weight of 0.5, and the total sum is one. Because the two pins of an AND gate are logically equivalent, they are weighted the same. The GNN may utilize feedback from gates in later levels of the netlist in which case the feedback signal may be treated as an input that arrives to the gate input in the prior level later.

The output of the graph neural network 304 includes embeddings for every combinational node/gate in the graph, and the last two fully connected layers map the high dimension embeddings back down to low (4) dimension output toggle rate features. Because the desired model is highly non-linear, non-linearity may be introduced using LeakyReLu activation functions for example in the first three layers, and Softmax activation on the last layer, because the four dimension toggle rate features necessarily sum to one (1). Different embodiments may use other types or mixed types of activation functions, such as sigmoid and ReLu. In summary, because the embeddings comprise both predecessor and local information, the graph neural network 304 may learn the correct output toggle rates with consideration to both local Boolean logic functions and re-convergence correlation caused by predecessors.

Same level nodes are processed in parallel within the graph neural network, while different level nodes are processed in sequence. Step 1 sends a message for the edges to the next node level, applying a function of local edge features and predecessor node's propagating features. Step 2 applies a function to aggregate incoming messages into one reduced message. Step 3 applies a function of the reduced message, local node features, and previous propagating node features to attain the new propagating node features. See Table 3 below.

TABLE 3

| | | |
|---|---|---|
| Step 1 | Message sending | msg = f(edge_features, h) |
| Step 2 | Message Reduction | reduce = f($msg_0$, $msg_1$, $msg_2$ . . .) |
| Step 3 | Node Transformation | $h_{new}$ = f(reduce, h, node_features) |

The first step in message sending is to take the state of edge features and multiply them by embeddings. This product is then utilized to determine the embeddings in the subsequent level from the predecessor nodes. In this step, h represents the high dimensional embeddings. The first step provides a weighted message from the predecessor nodes. In the second step, the message is reduced. The message reduction occurs to allow the embeddings to be updated on a per-node basis. Because each node may have multiple predecessors, a node may have multiple messages that need to be shaped into one message update. This may be done by integrating (e.g., summing) the messages. The third step is a node transformation where the embeddings are updated.

In step three, the reduced singular message may be matrix multiplied in the fully connected layer. By performing the matrix multiplication the fully connected layer transforms the message and outputs a new embedding for that node.

The neural network attempts to learn the weights of the fully connected layer from the transformation in order to determine the correct or near-correct embedding update method. These three steps may take place as part of the learning phase for the neural network.

The algorithms and techniques disclosed herein may be executed by computing devices utilizing one or more graphic processing unit (GPU) and/or general purpose data processor (e.g., a 'central processing unit or CPU). Exemplary architectures will now be described that may be configured to carry out the techniques disclosed herein on such devices.

The Following Description May Use Certain Acronyms and Abbreviations as Follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 9:
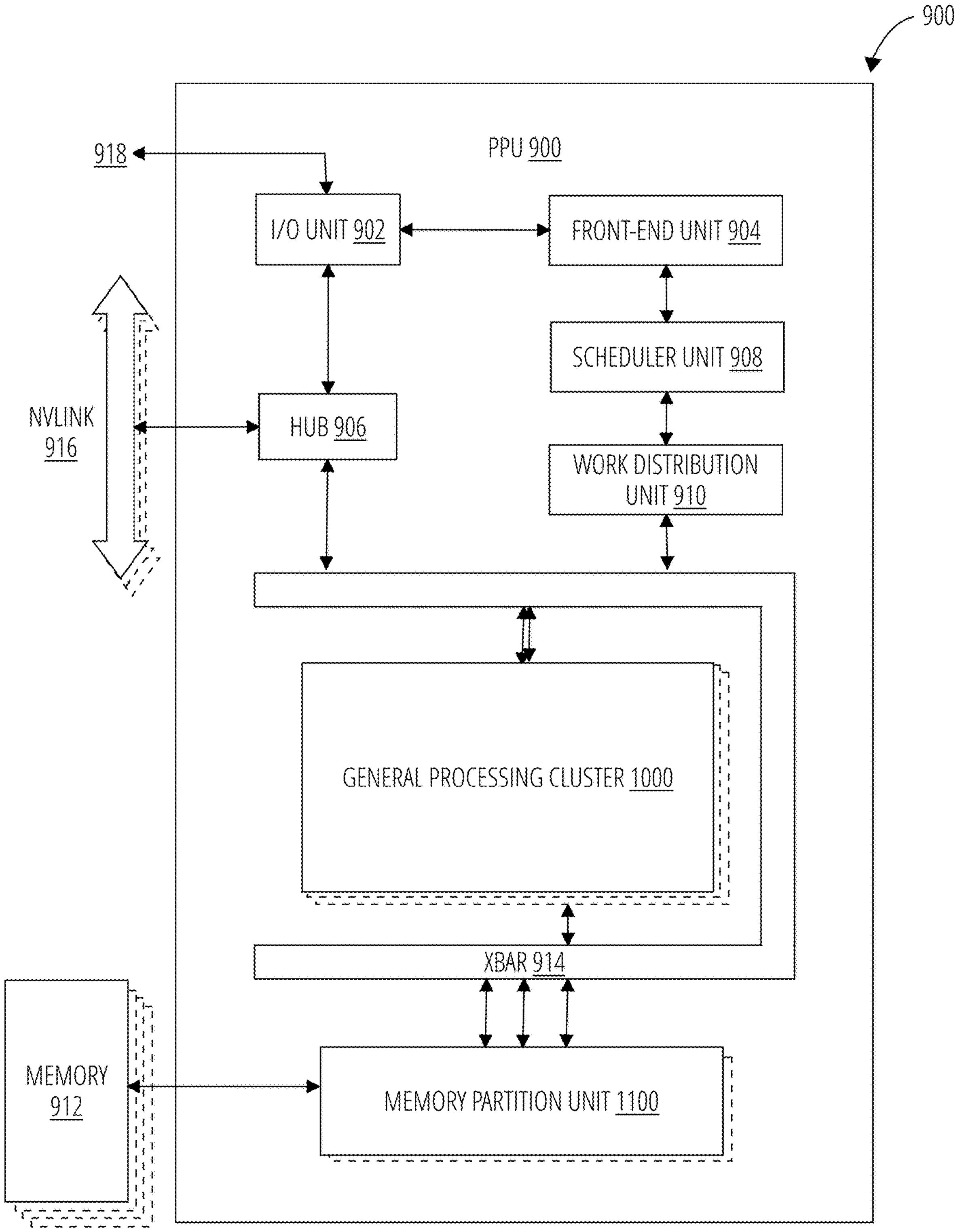
FIG. 9 depicts a parallel processing unit 900 in accordance with one embodiment.

FIG. 9 depicts a parallel processing unit 900, in accordance with an embodiment. In an embodiment, the parallel processing unit 900 is a multi-threaded processor that is implemented on one or more integrated circuit devices. The parallel processing unit 900 is a latency hiding architecture designed to process many threads in parallel. A thread (e.g., a thread of execution) is an instantiation of a set of instructions configured to be executed by the parallel processing unit 900. In an embodiment, the parallel processing unit 900 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 900 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 900 modules may be configured to accelerate thousands of High Performance Computing (HPC), data center, and machine learning applications (such as the graph neural network training technique 600 and graph neural network average power estimation technique 700 described previously). The parallel processing unit 900 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 9, the parallel processing unit 900 includes an I/O unit 902, a front-end unit 904, a scheduler unit 908, a work distribution unit 910, a hub 906, a crossbar 914, one or more general processing cluster 1000 modules, and one or more memory partition unit 1100 modules. The parallel processing unit 900 may be connected to a host processor or other parallel processing unit 900 modules via one or more high-speed NVLink 916 interconnects. The parallel processing unit 900 may be connected to a host processor or other peripheral devices via an interconnect 918. The parallel processing unit 900 may also be connected to a local memory comprising a number of memory 912 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 912 may comprise logic to configure the parallel processing unit 900 to carry out aspects of the techniques disclosed herein.

The NVLink 916 interconnect enables systems to scale and include one or more parallel processing unit 900 modules combined with one or more CPUs, supports cache coherence between the parallel processing unit 900 modules and CPUs, and CPU mastering. Data and/or commands may be transmitted by the NVLink 916 through the hub 906 to/from other units of the parallel processing unit 900 such as one or more copy engines, a video encoder, a video decoder, a power management unit, etc. (not explicitly shown). The NVLink 916 is described in more detail in conjunction with FIG. 13.

The I/O unit 902 is configured to transmit and receive communications (e.g., commands, data, etc.) from a host processor (not shown) over the interconnect 918. The I/O unit 902 may communicate with the host processor directly via the interconnect 918 or through one or more intermediate devices such as a memory bridge. In an embodiment, the I/O unit 902 may communicate with one or more other processors, such as one or more parallel processing unit 900 modules via the interconnect 918. In an embodiment, the I/O unit 902 implements a Peripheral Component Interconnect Express (PCIe) interface for communications over a PCIe bus and the interconnect 918 is a PCIe bus. In alternative embodiments, the I/O unit 902 may implement other types of well-known interfaces for communicating with external devices.

The I/O unit 902 decodes packets received via the interconnect 918. In an embodiment, the packets represent commands configured to cause the parallel processing unit 900 to perform various operations. The I/O unit 902 transmits the decoded commands to various other units of the parallel processing unit 900 as the commands may specify. For example, some commands may be transmitted to the front-end unit 904. Other commands may be transmitted to the hub 906 or other units of the parallel processing unit 900 such as one or more copy engines, a video encoder, a video decoder, a power management unit, etc. (not explicitly shown). In other words, the I/O unit 902 is configured to route communications between and among the various logical units of the parallel processing unit 900.

In an embodiment, a program executed by the host processor encodes a command stream in a buffer that provides workloads to the parallel processing unit 900 for processing. A workload may comprise several instructions and data to be processed by those instructions. The buffer is a region in a memory that is accessible (e.g., read/write) by both the host processor and the parallel processing unit 900. For example, the I/O unit 902 may be configured to access the buffer in a system memory connected to the interconnect 918 via memory requests transmitted over the interconnect 918. In an embodiment, the host processor writes the command stream to the buffer and then transmits a pointer to the start of the command stream to the parallel processing unit 900. The front-end unit 904 receives pointers to one or more command streams. The front-end unit 904 manages the one or more streams, reading commands from the streams and forwarding commands to the various units of the parallel processing unit 900.

The front-end unit 904 is coupled to a scheduler unit 908 that configures the various general processing cluster 1000 modules to process tasks defined by the one or more streams. The scheduler unit 908 is configured to track state information related to the various tasks managed by the scheduler unit 908. The state may indicate which general processing cluster 1000 a task is assigned to, whether the task is active or inactive, a priority level associated with the task, and so forth. The scheduler unit 908 manages the execution of a plurality of tasks on the one or more general processing cluster 1000 modules.

The scheduler unit 908 is coupled to a work distribution unit 910 that is configured to dispatch tasks for execution on the general processing cluster 1000 modules. The work distribution unit 910 may track a number of scheduled tasks received from the scheduler unit 908. In an embodiment, the work distribution unit 910 manages a pending task pool and an active task pool for each of the general processing cluster 1000 modules. The pending task pool may comprise a number of slots (e.g., 32 slots) that contain tasks assigned to be processed by a particular general processing cluster 1000. The active task pool may comprise a number of slots (e.g., 4 slots) for tasks that are actively being processed by the general processing cluster 1000 modules. As a general processing cluster 1000 finishes the execution of a task, that task is evicted from the active task pool for the general processing cluster 1000 and one of the other tasks from the pending task pool is selected and scheduled for execution on the general processing cluster 1000. If an active task has been idle on the general processing cluster 1000, such as while waiting for a data dependency to be resolved, then the active task may be evicted from the general processing cluster 1000 and returned to the pending task pool while another task in the pending task pool is selected and scheduled for execution on the general processing cluster 1000.

The work distribution unit 910 communicates with the one or more general processing cluster 1000 modules via crossbar 914. The crossbar 914 is an interconnect network that couples many of the units of the parallel processing unit 900 to other units of the parallel processing unit 900. For example, the crossbar 914 may be configured to couple the work distribution unit 910 to a particular general processing cluster 1000. Although not shown explicitly, one or more other units of the parallel processing unit 900 may also be connected to the crossbar 914 via the hub 906.

The tasks are managed by the scheduler unit 908 and dispatched to a general processing cluster 1000 by the work distribution unit 910. The general processing cluster 1000 is configured to process the task and generate results. The results may be consumed by other tasks within the general processing cluster 1000, routed to a different general processing cluster 1000 via the crossbar 914, or stored in the memory 912. The results can be written to the memory 912 via the memory partition unit 1100 modules, which implement a memory interface for reading and writing data to/from the memory 912. The results can be transmitted to another parallel processing unit 900 or CPU via the NVLink 916. In an embodiment, the parallel processing unit 900 includes a number U of memory partition unit 1100 modules that is equal to the number of separate and distinct memory 912 devices coupled to the parallel processing unit 900. A memory partition unit 1100 will be described in more detail below in conjunction with FIG. 11.

In an embodiment, a host processor executes a driver kernel that implements an application programming interface (API) that enables one or more applications executing on the host processor to schedule operations for execution on the parallel processing unit 900. In an embodiment, multiple compute applications are simultaneously executed by the parallel processing unit 900 and the parallel processing unit 900 provides isolation, quality of service (QoS), and independent address spaces for the multiple compute applications. An application may generate instructions (e.g., API calls) that cause the driver kernel to generate one or more tasks for execution by the parallel processing unit 900. The driver kernel outputs tasks to one or more streams being processed by the parallel processing unit 900. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 12.

Figure 10:
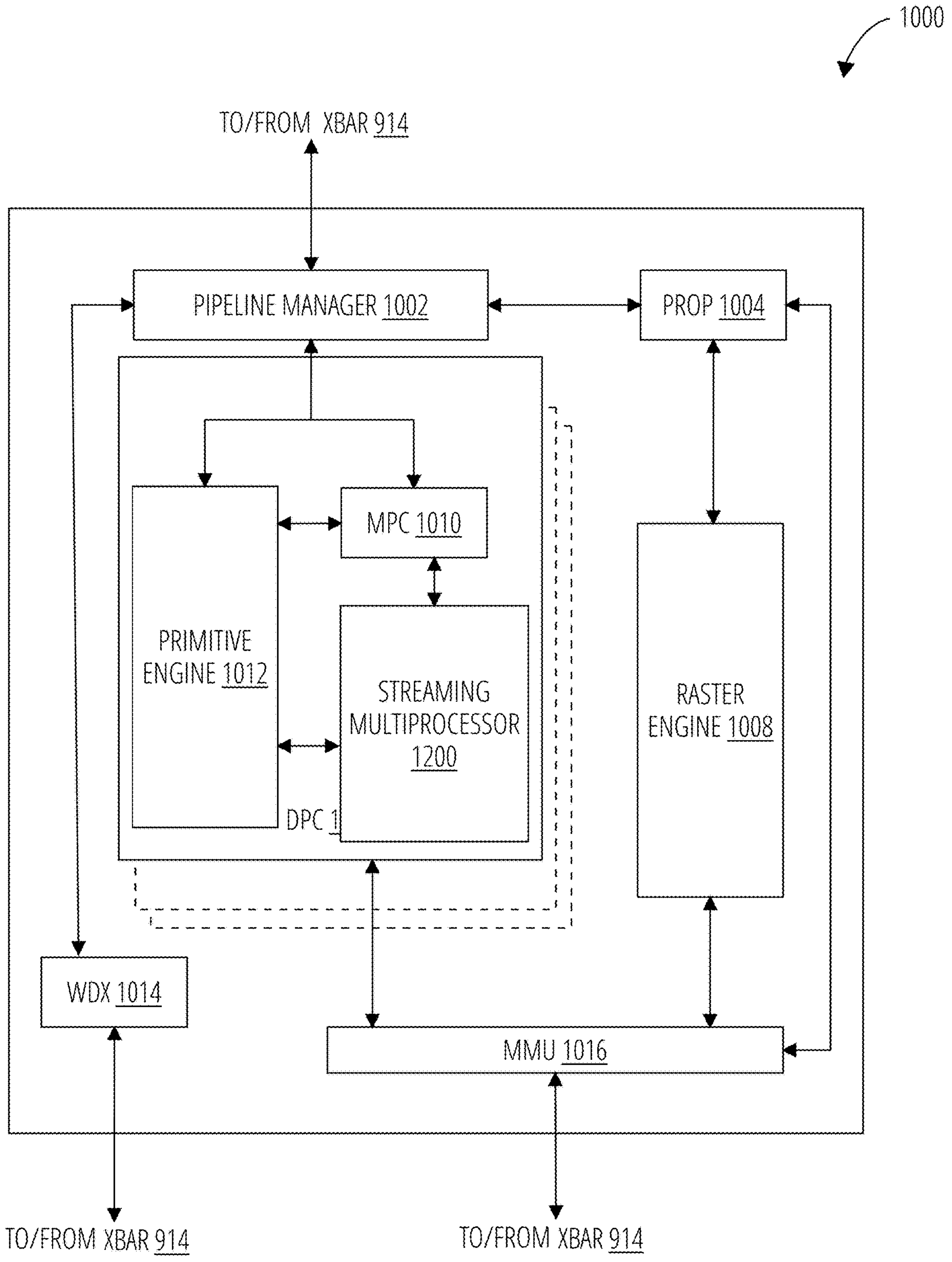
FIG. 10 depicts a general processing cluster 1000 in accordance with one embodiment.

FIG. 10 depicts a general processing cluster 1000 of the parallel processing unit 900 of FIG. 9, in accordance with an embodiment. As shown in FIG. 10, each general processing cluster 1000 includes a number of hardware units for processing tasks. In an embodiment, each general processing cluster 1000 includes a pipeline manager 1002, a pre-raster operations unit 1004, a raster engine 1008, a work distribution crossbar 1014, a memory management unit 1016, and one or more data processing cluster 1006. It will be appreciated that the general processing cluster 1000 of FIG. 10 may include other hardware units in lieu of or in addition to the units shown in FIG. 10.

In an embodiment, the operation of the general processing cluster 1000 is controlled by the pipeline manager 1002. The pipeline manager 1002 manages the configuration of the one or more data processing cluster 1006 modules for processing tasks allocated to the general processing cluster 1000. In an embodiment, the pipeline manager 1002 may configure at least one of the one or more data processing cluster 1006 modules to implement at least a portion of a graphics rendering pipeline. For example, a data processing cluster 1006 may be configured to execute a vertex shader program on the programmable streaming multiprocessor 1200. The pipeline manager 1002 may also be configured to route packets received from the work distribution unit 910 to the appropriate logical units within the general processing cluster 1000. For example, some packets may be routed to fixed function hardware units in the pre-raster operations unit 1004 and/or raster engine 1008 while other packets may be routed to the data processing cluster 1006 modules for processing by the primitive engine 1012 or the streaming multiprocessor 1200. In an embodiment, the pipeline manager 1002 may configure at least one of the one or more data processing cluster 1006 modules to implement a neural network model and/or a computing pipeline.

Figure 11:
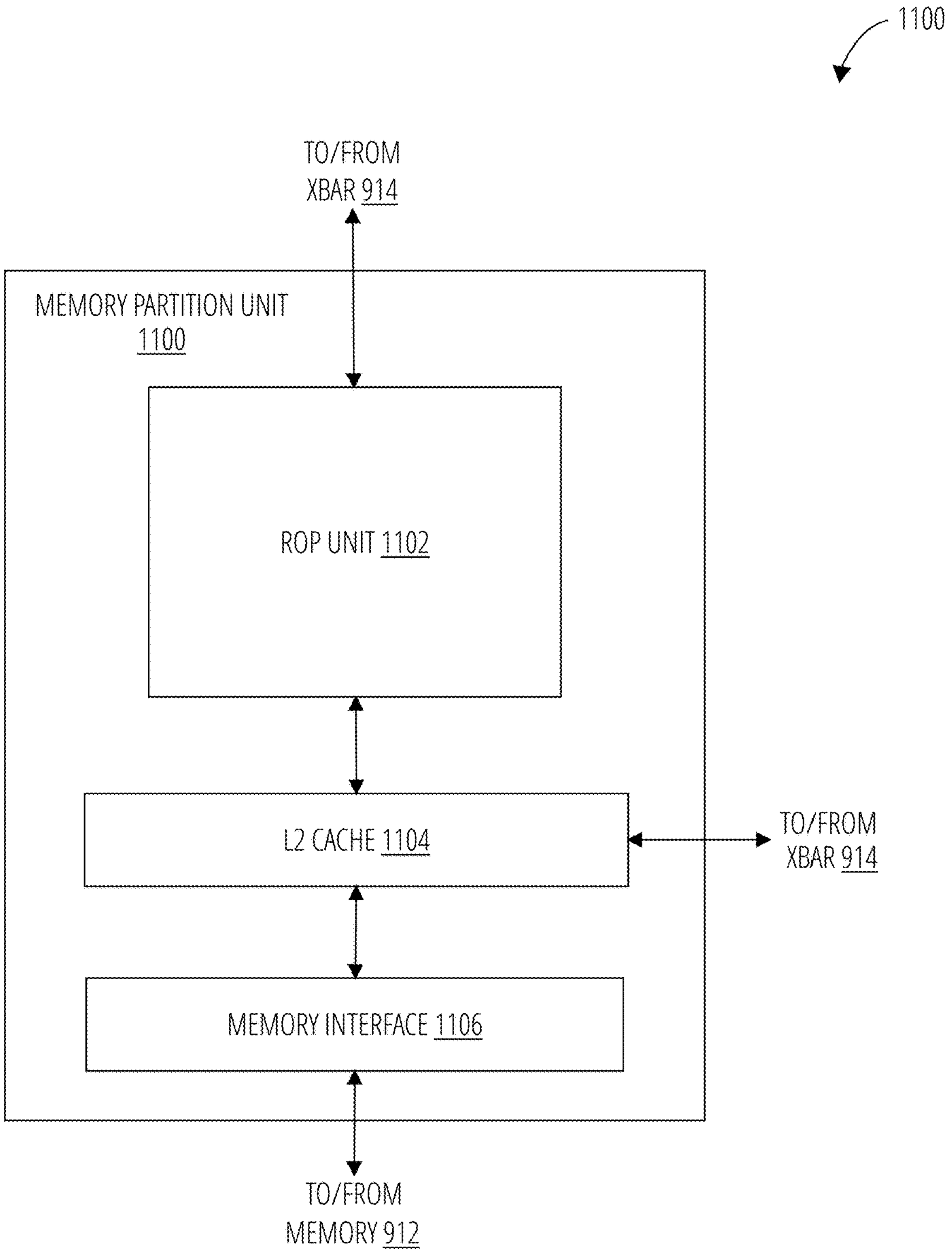
FIG. 11 depicts a memory partition unit 1100 in accordance with one embodiment.

The pre-raster operations unit 1004 is configured to route data generated by the raster engine 1008 and the data processing cluster 1006 modules to a Raster Operations (ROP) unit, described in more detail in conjunction with FIG. 11. The pre-raster operations unit 1004 may also be configured to perform optimizations for color blending, organize pixel data, perform address translations, and the like.

The raster engine 1008 includes a number of fixed function hardware units configured to perform various raster operations. In an embodiment, the raster engine 1008 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1008 comprises fragments to be processed, for example, by a fragment shader implemented within a data processing cluster 1006.

Each data processing cluster 1006 included in the general processing cluster 1000 includes an M-pipe controller 1010, a primitive engine 1012, and one or more streaming multiprocessor 1200 modules. The M-pipe controller 1010 controls the operation of the data processing cluster 1006, routing packets received from the pipeline manager 1002 to the appropriate units in the data processing cluster 1006. For example, packets associated with a vertex may be routed to the primitive engine 1012, which is configured to fetch vertex attributes associated with the vertex from the memory 912. In contrast, packets associated with a shader program may be transmitted to the streaming multiprocessor 1200.

The streaming multiprocessor 1200 comprises a programmable streaming processor that is configured to process tasks represented by a number of threads. Each streaming multiprocessor 1200 is multi-threaded and configured to execute a plurality of threads (e.g., 32 threads) from a particular group of threads concurrently. In an embodiment, the streaming multiprocessor 1200 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1200 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1200 will be described in more detail below in conjunction with FIG. 12.

The memory management unit 1016 provides an interface between the general processing cluster 1000 and the memory partition unit 1100. The memory management unit 1016 may provide translation of virtual addresses into physical addresses, memory protection, and arbitration of memory requests. In an embodiment, the memory management unit 1016 provides one or more translation lookaside buffers (TLBs) for performing translation of virtual addresses into physical addresses in the memory 912.

FIG. 11 depicts a memory partition unit 1100 of the parallel processing unit 900 of FIG. 9, in accordance with an embodiment. As shown in FIG. 11, the memory partition unit 1100 includes a raster operations unit 1102, a level two cache 1104, and a memory interface 1106. The memory interface 1106 is coupled to the memory 912. Memory interface 1106 may implement 32, 64, 128, 1024-bit data buses, or the like, for high-speed data transfer. In an embodiment, the parallel processing unit 900 incorporates U memory interface 1106 modules, one memory interface 1106 per pair of memory partition unit 1100 modules, where each pair of memory partition unit 1100 modules is connected to a corresponding memory 912 device. For example, parallel processing unit 900 may be connected to up to Y memory 912 devices, such as high bandwidth memory stacks or graphics double-data-rate, version 5, synchronous dynamic random access memory, or other types of persistent storage.

In an embodiment, the memory interface 1106 implements an HBM2 memory interface and Y equals half U. In an embodiment, the HBM2 memory stacks are located on the same physical package as the parallel processing unit 900, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 912 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 900 modules process very large datasets and/or run applications for extended periods.

In an embodiment, the parallel processing unit 900 implements a multi-level memory hierarchy. In an embodiment, the memory partition unit 1100 supports a unified memory to provide a single unified virtual address space for CPU and parallel processing unit 900 memory, enabling data sharing between virtual memory systems. In an embodiment the frequency of accesses by a parallel processing unit 900 to memory located on other processors is traced to ensure that memory pages are moved to the physical memory of the parallel processing unit 900 that is accessing the pages more frequently. In an embodiment, the NVLink 916 supports address translation services allowing the parallel processing unit 900 to directly access a CPU's page tables and providing full access to CPU memory by the parallel processing unit 900.

In an embodiment, copy engines transfer data between multiple parallel processing unit 900 modules or between parallel processing unit 900 modules and CPUs. The copy engines can generate page faults for addresses that are not mapped into the page tables. The memory partition unit 1100 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 912 or other system memory may be fetched by the memory partition unit 1100 and stored in the level two cache 1104, which is located on-chip and is shared between the various general processing cluster 1000 modules. As shown, each memory partition unit 1100 includes a portion of the level two cache 1104 associated with a corresponding memory 912 device. Lower level caches may then be implemented in various units within the general processing cluster 1000 modules. For example, each of the streaming multiprocessor 1200 modules may implement an L1 cache. The L1 cache is private memory that is dedicated to a particular streaming multiprocessor 1200. Data from the level two cache 1104 may be fetched and stored in each of the L1 caches for processing in the functional units of the streaming multiprocessor 1200 modules. The level two cache 1104 is coupled to the memory interface 1106 and the crossbar 914.

The raster operations unit 1102 performs graphics raster operations related to pixel color, such as color compression, pixel blending, and the like. The raster operations unit 1102 also implements depth testing in conjunction with the raster engine 1008, receiving a depth for a sample location associated with a pixel fragment from the culling engine of the raster engine 1008. The depth is tested against a corresponding depth in a depth buffer for a sample location associated with the fragment. If the fragment passes the depth test for the sample location, then the raster operations unit 1102 updates the depth buffer and transmits a result of the depth test to the raster engine 1008. It will be appreciated that the number of partition memory partition unit 1100 modules may be different than the number of general processing cluster 1000 modules and, therefore, each raster operations unit 1102 may be coupled to each of the general processing cluster 1000 modules. The raster operations unit 1102 tracks packets received from the different general processing cluster 1000 modules and determines which general processing cluster 1000 that a result generated by the raster operations unit 1102 is routed to through the crossbar 914. Although the raster operations unit 1102 is included within the memory partition unit 1100 in FIG. 11, in other embodiment, the raster operations unit 1102 may be outside of the memory partition unit 1100. For example, the raster operations unit 1102 may reside in the general processing cluster 1000 or another unit.

Figure 12:
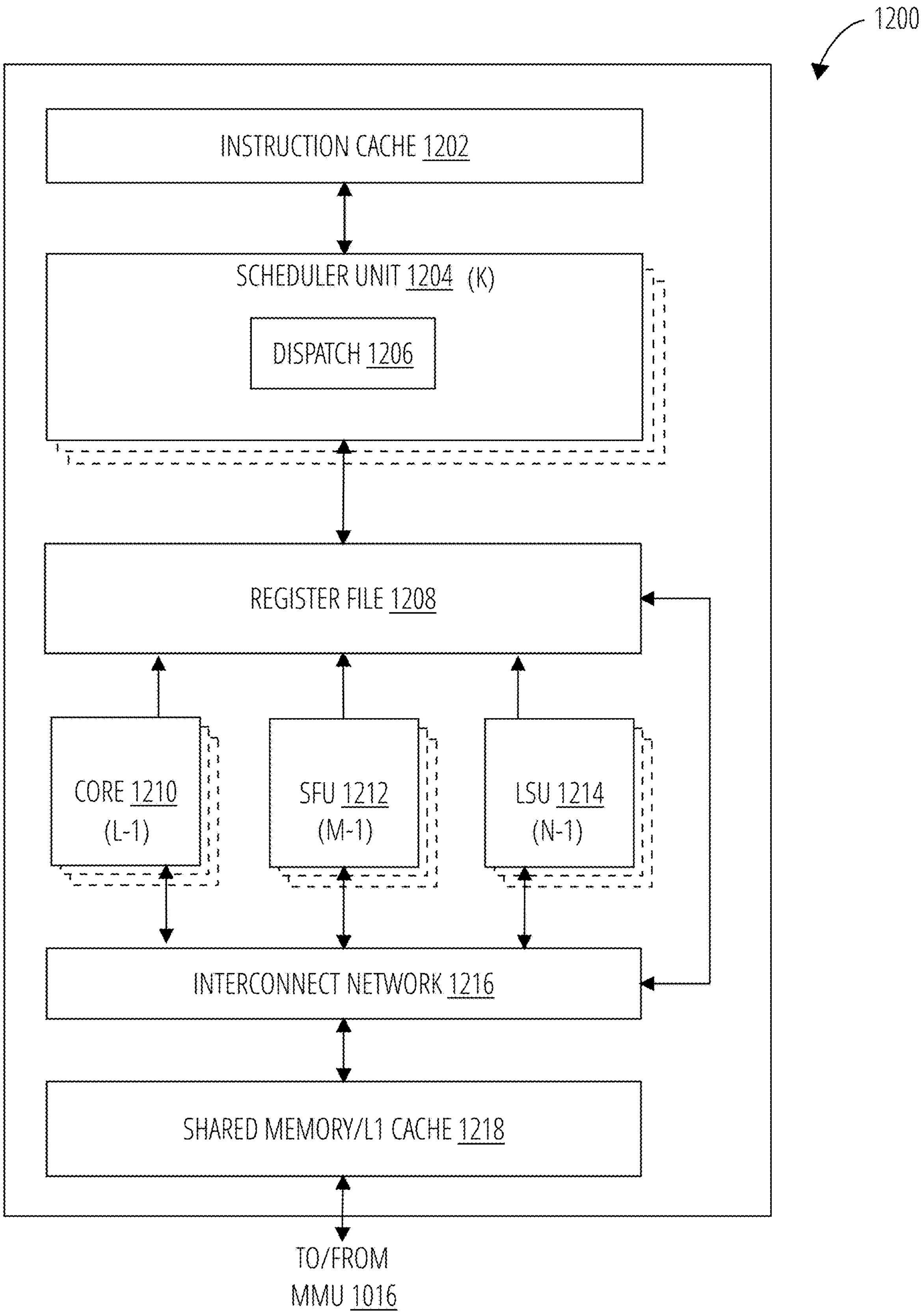
FIG. 12 depicts a streaming multiprocessor 1200 in accordance with one embodiment.

FIG. 12 illustrates the streaming multiprocessor 1200 of FIG. 10, in accordance with an embodiment. As shown in FIG. 12, the streaming multiprocessor 1200 includes an instruction cache 1202, one or more scheduler unit 1204 modules (e.g., such as scheduler unit 908), a register file 1208, one or more processing core 1210 modules, one or more special function unit 1212 modules, one or more load/store unit 1214 modules, an interconnect network 1216, and a shared memory/L1 cache 1218.

As described above, the work distribution unit 910 dispatches tasks for execution on the general processing cluster 1000 modules of the parallel processing unit 900. The tasks are allocated to a particular data processing cluster 1006 within a general processing cluster 1000 and, if the task is associated with a shader program, the task may be allocated to a streaming multiprocessor 1200. The scheduler unit 908 receives the tasks from the work distribution unit 910 and manages instruction scheduling for one or more thread blocks assigned to the streaming multiprocessor 1200. The scheduler unit 1204 schedules thread blocks for execution as warps of parallel threads, where each thread block is allocated at least one warp. In an embodiment, each warp executes 32 threads. The scheduler unit 1204 may manage a plurality of different thread blocks, allocating the warps to the different thread blocks and then dispatching instructions from the plurality of different cooperative groups to the various functional units (e.g., core 1210 modules, special function unit 1212 modules, and load/store unit 1214 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1206 unit is configured within the scheduler unit 1204 to transmit instructions to one or more of the functional units. In one embodiment, the scheduler unit 1204 includes two dispatch 1206 units that enable two different instructions from the same warp to be dispatched during each clock cycle. In alternative embodiments, each scheduler unit 1204 may include a single dispatch 1206 unit or additional dispatch 1206 units.

Each streaming multiprocessor 1200 includes a register file 1208 that provides a set of registers for the functional units of the streaming multiprocessor 1200. In an embodiment, the register file 1208 is divided between each of the functional units such that each functional unit is allocated a dedicated portion of the register file 1208. In another embodiment, the register file 1208 is divided between the different warps being executed by the streaming multiprocessor 1200. The register file 1208 provides temporary storage for operands connected to the data paths of the functional units.

Each streaming multiprocessor 1200 comprises L processing core 1210 modules. In an embodiment, the streaming multiprocessor 1200 includes a large number (e.g., 128, etc.) of distinct processing core 1210 modules. Each core 1210 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1210 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1210 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1200 also comprises M special function unit 1212 modules that perform special functions (e.g., attribute evaluation, reciprocal square root, and the like). In an embodiment, the special function unit 1212 modules may include a tree traversal unit configured to traverse a hierarchical tree data structure. In an embodiment, the special function unit 1212 modules may include texture unit configured to perform texture map filtering operations. In an embodiment, the texture units are configured to load texture maps (e.g., a 2D array of texels) from the memory 912 and sample the texture maps to produce sampled texture values for use in shader programs executed by the streaming multiprocessor 1200. In an embodiment, the texture maps are stored in the shared memory/L1 cache 1218. The texture units implement texture operations such as filtering operations using mip-maps (e.g., texture maps of varying levels of detail). In an embodiment, each streaming multiprocessor 1200 includes two texture units.

Each streaming multiprocessor 1200 also comprises N load/store unit 1214 modules that implement load and store operations between the shared memory/L1 cache 1218 and the register file 1208. Each streaming multiprocessor 1200 includes an interconnect network 1216 that connects each of the functional units to the register file 1208 and the load/store unit 1214 to the register file 1208 and shared memory/L1 cache 1218. In an embodiment, the interconnect network 1216 is a crossbar that can be configured to connect any of the functional units to any of the registers in the register file 1208 and connect the load/store unit 1214 modules to the register file 1208 and memory locations in shared memory/L1 cache 1218.

The shared memory/L1 cache 1218 is an array of on-chip memory that allows for data storage and communication between the streaming multiprocessor 1200 and the primitive engine 1012 and between threads in the streaming multiprocessor 1200. In an embodiment, the shared memory/L1 cache 1218 comprises 128 KB of storage capacity and is in the path from the streaming multiprocessor 1200 to the memory partition unit 1100. The shared memory/L1 cache 1218 can be used to cache reads and writes. One or more of the shared memory/L1 cache 1218, level two cache 1104, and memory 912 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1218 enables the shared memory/L1 cache 1218 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 9, are bypassed, creating a much simpler programming model. In the general purpose parallel computation configuration, the work distribution unit 910 assigns and distributes blocks of threads directly to the data processing cluster 1006 modules. The threads in a block execute the same program, using a unique thread ID in the calculation to ensure each thread generates unique results, using the streaming multiprocessor 1200 to execute the program and perform calculations, shared memory/L1 cache 1218 to communicate between threads, and the load/store unit 1214 to read and write global memory through the shared memory/L1 cache 1218 and the memory partition unit 1100. When configured for general purpose parallel computation, the streaming multiprocessor 1200 can also write commands that the scheduler unit 908 can use to launch new work on the data processing cluster 1006 modules.

The parallel processing unit 900 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 900 is embodied on a single semiconductor substrate. In another embodiment, the parallel processing unit 900 is included in a system-on-a-chip (SoC) along with one or more other devices such as additional parallel processing unit 900 modules, the memory 912, a reduced instruction set computer (RISC) CPU, a memory management unit (MMU), a digital-to-analog converter (DAC), and the like.

In an embodiment, the parallel processing unit 900 may be included on a graphics card that includes one or more memory devices. The graphics card may be configured to interface with a PCIe slot on a motherboard of a desktop computer. In yet another embodiment, the parallel processing unit 900 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13:
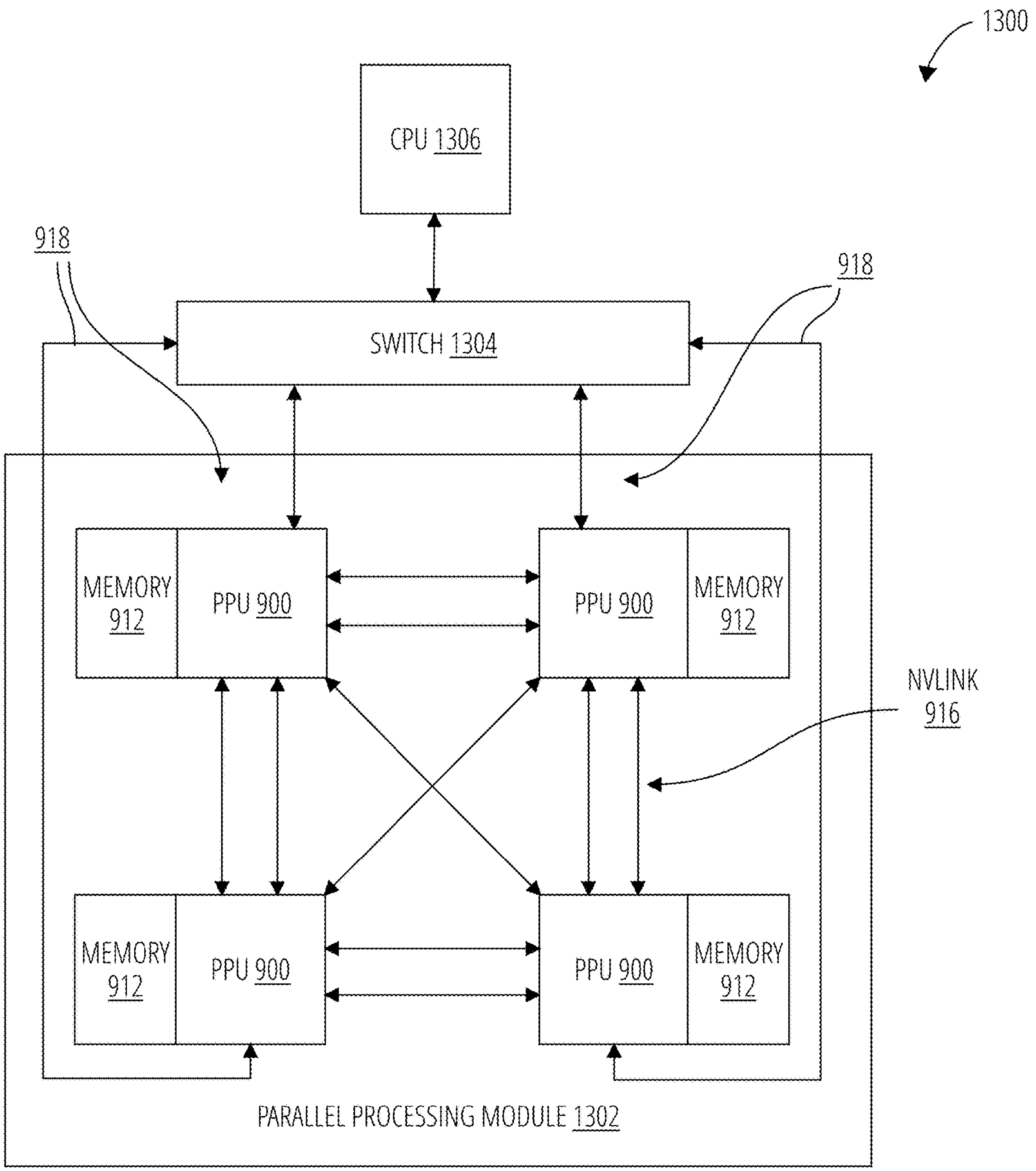
FIG. 13 depicts a processing system 1300 in accordance with one embodiment.

FIG. 13 is a conceptual diagram of a processing system 1300 implemented using the parallel processing unit 900 of FIG. 9, in accordance with an embodiment. The processing system 1300 includes a central processing unit 1306, switch 1304, and multiple parallel processing unit 900 modules each and respective memory 912 modules. The NVLink 916 provides high-speed communication links between each of the parallel processing unit 900 modules. Although a particular number of NVLink 916 and interconnect 918 connections are illustrated in FIG. 13, the number of connections to each parallel processing unit 900 and the central processing unit 1306 may vary. The switch 1304 interfaces between the interconnect 918 and the central processing unit 1306. The parallel processing unit 900 modules, memory 912 modules, and NVLink 916 connections may be situated on a single semiconductor platform to form a parallel processing module 1302. In an embodiment, the switch 1304 supports two or more protocols to interface between various different connections and/or links.

In another embodiment (not shown), the NVLink 916 provides one or more high-speed communication links between each of the parallel processing unit 900 modules and the central processing unit 1306 and the switch 1304 interfaces between the interconnect 918 and each of the parallel processing unit 900 modules. The parallel processing unit 900 modules, memory 912 modules, and interconnect 918 may be situated on a single semiconductor platform to form a parallel processing module 1302. In yet another embodiment (not shown), the interconnect 918 provides one or more communication links between each of the parallel processing unit 900 modules and the central processing unit 1306 and the switch 1304 interfaces between each of the parallel processing unit 900 modules using the NVLink 916 to provide one or more high-speed communication links between the parallel processing unit 900 modules. In another embodiment (not shown), the NVLink 916 provides one or more high-speed communication links between the parallel processing unit 900 modules and the central processing unit 1306 through the switch 1304. In yet another embodiment (not shown), the interconnect 918 provides one or more communication links between each of the parallel processing unit 900 modules directly. One or more of the NVLink 916 high-speed communication links may be implemented as a physical NVLink interconnect or either an on-chip or on-die interconnect using the same protocol as the NVLink 916.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1302 may be implemented as a circuit board substrate and each of the parallel processing unit 900 modules and/or memory 912 modules may be packaged devices. In an embodiment, the central processing unit 1306, switch 1304, and the parallel processing module 1302 are situated on a single semiconductor platform.

In an embodiment, the signaling rate of each NVLink 916 is 20 to 25 Gigabits/second and each parallel processing unit 900 includes six NVLink 916 interfaces (as shown in FIG. 13, five NVLink 916 interfaces are included for each parallel processing unit 900). Each NVLink 916 provides a data transfer rate of 25 Gigabytes/second in each direction, with six links providing 300 Gigabytes/second. The NVLink 916 can be used exclusively for PPU-to-PPU communication as shown in FIG. 13, or some combination of PPU-to-PPU and PPU-to-CPU, when the central processing unit 1306 also includes one or more NVLink 916 interfaces.

In an embodiment, the NVLink 916 allows direct load/store/atomic access from the central processing unit 1306 to each parallel processing unit 900 module's memory 912. In an embodiment, the NVLink 916 supports coherency operations, allowing data read from the memory 912 modules to be stored in the cache hierarchy of the central processing unit 1306, reducing cache access latency for the central processing unit 1306. In an embodiment, the NVLink 916 includes support for Address Translation Services (ATS), allowing the parallel processing unit 900 to directly access page tables within the central processing unit 1306. One or more of the NVLink 916 may also be configured to operate in a low-power mode.

Figure 14:
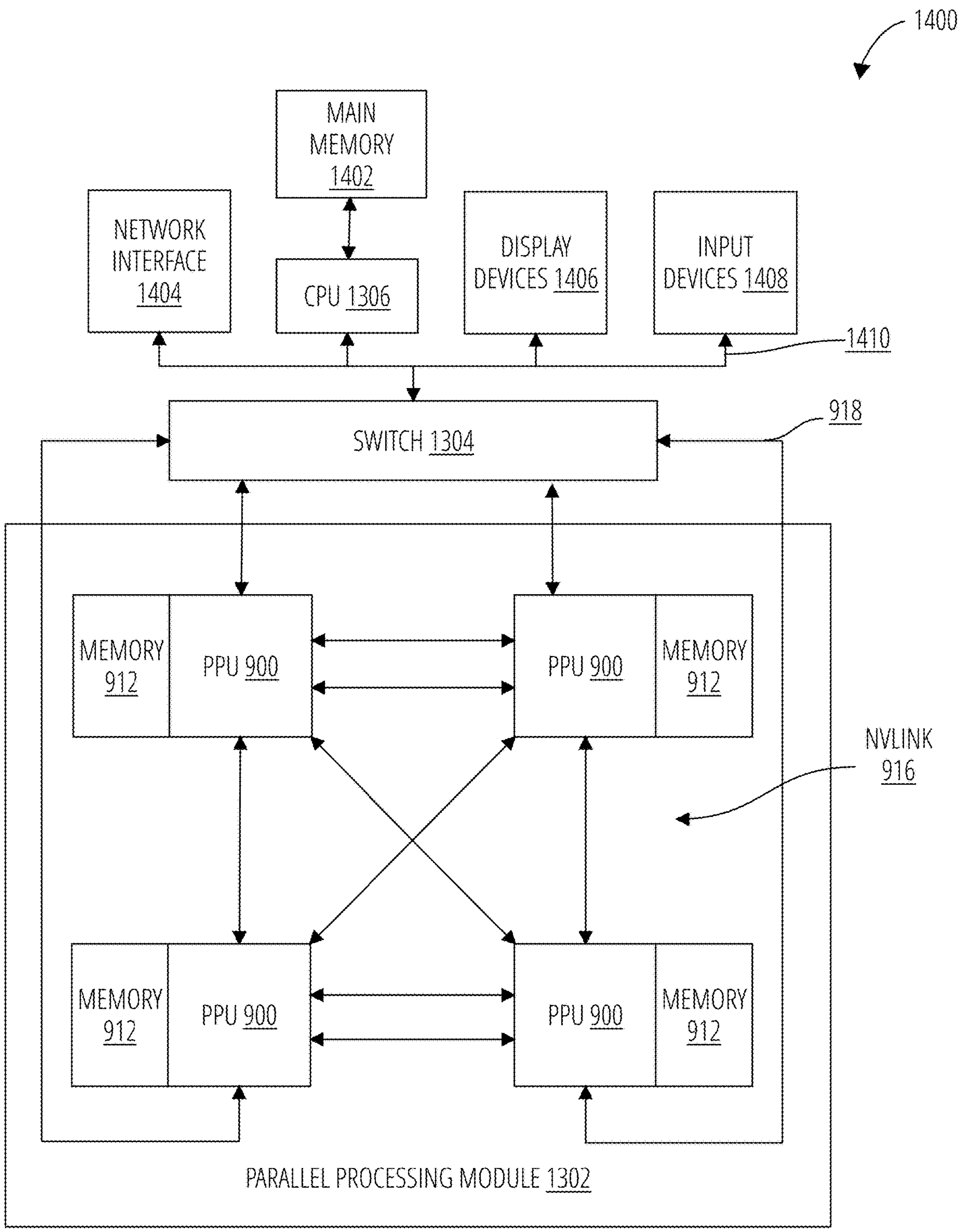
FIG. 14 depicts an exemplary processing system 1400 in accordance with another embodiment.

FIG. 14 depicts an exemplary processing system 1400 in which the various architecture and/or functionality of the various previous embodiments may be implemented. As shown, an exemplary processing system 1400 is provided including at least one central processing unit 1306 that is connected to a communications bus 1410. The communication communications bus 1410 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1400 also includes a main memory 1402. Control logic (software) and data are stored in the main memory 1402 which may take the form of random access memory (RAM).

The exemplary processing system 1400 also includes input devices 1408, the parallel processing module 1302, and display devices 1406, e.g. a conventional CRT (cathode ray tube), LCD (liquid crystal display), LED (light emitting diode), plasma display or the like. User input may be received from the input devices 1408, e.g., keyboard, mouse, touchpad, microphone, and the like. Each of the foregoing modules and/or devices may even be situated on a single semiconductor platform to form the exemplary processing system 1400. Alternately, the various modules may also be situated separately or in various combinations of semiconductor platforms per the desires of the user.

Further, the exemplary processing system 1400 may be coupled to a network (e.g., a telecommunications network, local area network (LAN), wireless network, wide area network (WAN) such as the Internet, peer-to-peer network, cable network, or the like) through a network interface 1404 for communication purposes.

The exemplary processing system 1400 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, such as programs to implement the average power estimation system 300, graph neural network architecture 400, gate-level netlist to node embedding transformation process 500, graph neural network training technique 600, graph neural network average power estimation technique 700, and graph neural network messaging process 800*a* may be stored in the main memory 1402 and/or the secondary storage. Such computer programs, when executed, enable the exemplary processing system 1400 to perform various functions. The main memory 1402, the storage, and/or any other storage are possible examples of computer-readable media.

The architecture and/or functionality of the various previous FIGURES may be implemented in the context of a general computer system, a circuit board system, a game console system dedicated for entertainment purposes, an application-specific system, and/or any other desired system. For example, the exemplary processing system 1400 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 14 is a conceptual diagram of a graphics processing pipeline 1500 implemented by the parallel processing unit 900 of FIG. 9, in accordance with an embodiment. In an embodiment, the parallel processing unit 900 comprises a graphics processing unit (GPU). The parallel processing unit 900 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 900 can be configured to process the graphics primitives to generate a frame buffer (e.g., pixel data for each of the pixels of the display).

An application writes model data for a scene (e.g., a collection of vertices and attributes) to a memory such as a system memory or memory 912. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1200 modules of the parallel processing unit 900 including one or more of a vertex shader, hull shader, domain shader, geometry shader, and a pixel shader. For example, one or more of the streaming multiprocessor 1200 modules may be configured to execute a vertex shader program that processes a number of vertices defined by the model data. In an embodiment, the different streaming multiprocessor 1200 modules may be configured to execute different shader programs concurrently. For example, a first subset of streaming multiprocessor 1200 modules may be configured to execute a vertex shader program while a second subset of streaming multiprocessor 1200 modules may be configured to execute a pixel shader program. The first subset of streaming multiprocessor 1200 modules processes vertex data to produce processed vertex data and writes the processed vertex data to the level two cache 1104 and/or the memory 912. After the processed vertex data is rasterized (e.g., transformed from three-dimensional data into two-dimensional data in screen space) to produce fragment data, the second subset of streaming multiprocessor 1200 modules executes a pixel shader to produce processed fragment data, which is then blended with other processed fragment data and written to the frame buffer in memory 912. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1500 receives input data 601 that is transmitted from one stage to the next stage of the graphics processing pipeline 1500 to generate output data 1504. In an embodiment, the graphics processing pipeline 1500 may represent a graphics processing pipeline defined by the OpenGL® API. As an option, the graphics processing pipeline 1500 may be implemented in the context of the functionality and architecture of the previous Figures and/or any subsequent Figure(s).

Figure 15:
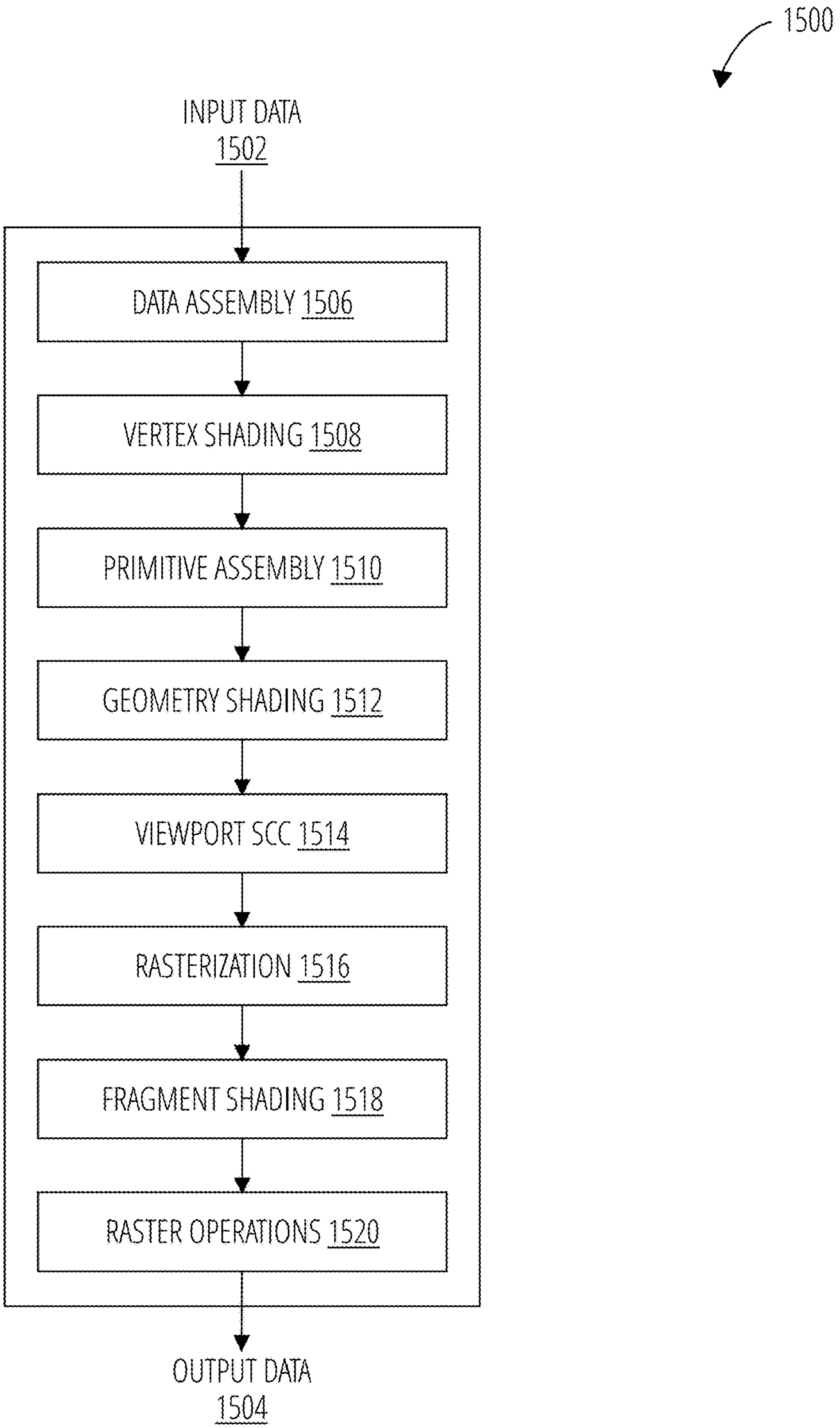
FIG. 15 depicts a graphics processing pipeline 1500 in accordance with one embodiment.

As shown in FIG. 15, the graphics processing pipeline 1500 comprises a pipeline architecture that includes a number of stages. The stages include, but are not limited to, a data assembly 1506 stage, a vertex shading 1508 stage, a primitive assembly 1510 stage, a geometry shading 1512 stage, a viewport SCC 1514 stage, a rasterization 1516 stage, a fragment shading 1518 stage, and a raster operations 1520 stage. In an embodiment, the input data 1502 comprises commands that configure the processing units to implement the stages of the graphics processing pipeline 1500 and geometric primitives (e.g., points, lines, triangles, quads, triangle strips or fans, etc.) to be processed by the stages. The output data 1504 may comprise pixel data (e.g., color data) that is copied into a frame buffer or other type of surface data structure in a memory.

The data assembly 1506 stage receives the input data 1502 that specifies vertex data for high-order surfaces, primitives, or the like. The data assembly 1506 stage collects the vertex data in a temporary storage or queue, such as by receiving a command from the host processor that includes a pointer to a buffer in memory and reading the vertex data from the buffer. The vertex data is then transmitted to the vertex shading 1508 stage for processing.

The vertex shading 1508 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1508 stage may manipulate individual vertex attributes such as position, color, texture coordinates, and the like. In other words, the vertex shading 1508 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1508 stage generates transformed vertex data that is transmitted to the primitive assembly 1510 stage.

The primitive assembly 1510 stage collects vertices output by the vertex shading 1508 stage and groups the vertices into geometric primitives for processing by the geometry shading 1512 stage. For example, the primitive assembly 1510 stage may be configured to group every three consecutive vertices as a geometric primitive (e.g., a triangle) for transmission to the geometry shading 1512 stage. In some embodiments, specific vertices may be reused for consecutive geometric primitives (e.g., two consecutive triangles in a triangle strip may share two vertices). The primitive assembly 1510 stage transmits geometric primitives (e.g., a collection of associated vertices) to the geometry shading 1512 stage.

The geometry shading 1512 stage processes geometric primitives by performing a set of operations (e.g., a geometry shader or program) on the geometric primitives. Tessellation operations may generate one or more geometric primitives from each geometric primitive. In other words, the geometry shading 1512 stage may subdivide each geometric primitive into a finer mesh of two or more geometric primitives for processing by the rest of the graphics processing pipeline 1500. The geometry shading 1512 stage transmits geometric primitives to the viewport SCC 1514 stage.

In an embodiment, the graphics processing pipeline 1500 may operate within a streaming multiprocessor and the vertex shading 1508 stage, the primitive assembly 1510 stage, the geometry shading 1512 stage, the fragment shading 1518 stage, and/or hardware/software associated therewith, may sequentially perform processing operations. Once the sequential processing operations are complete, in an embodiment, the viewport SCC 1514 stage may utilize the data. In an embodiment, primitive data processed by one or more of the stages in the graphics processing pipeline 1500 may be written to a cache (e.g. L1 cache, a vertex cache, etc.). In this case, in an embodiment, the viewport SCC 1514 stage may access the data in the cache. In an embodiment, the viewport SCC 1514 stage and the rasterization 1516 stage are implemented as fixed function circuitry.

The viewport SCC 1514 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1516 stage.

The rasterization 1516 stage converts the 3D geometric primitives into 2D fragments (e.g. capable of being utilized for display, etc.). The rasterization 1516 stage may be configured to utilize the vertices of the geometric primitives to setup a set of plane equations from which various attributes can be interpolated. The rasterization 1516 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1516 stage generates fragment data (e.g., interpolated vertex attributes associated with a particular sample location for each covered pixel) that are transmitted to the fragment shading 1518 stage.

The fragment shading 1518 stage processes fragment data by performing a set of operations (e.g., a fragment shader or a program) on each of the fragments. The fragment shading 1518 stage may generate pixel data (e.g., color values) for the fragment such as by performing lighting operations or sampling texture maps using interpolated texture coordinates for the fragment. The fragment shading 1518 stage generates pixel data that is transmitted to the raster operations 1520 stage.

The raster operations 1520 stage may perform various operations on the pixel data such as performing alpha tests, stencil tests, and blending the pixel data with other pixel data corresponding to other fragments associated with the pixel. When the raster operations 1520 stage has finished processing the pixel data (e.g., the output data 1504), the pixel data may be written to a render target such as a frame buffer, a color buffer, or the like.

It will be appreciated that one or more additional stages may be included in the graphics processing pipeline 1500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1512 stage). Other types of graphics processing pipelines are contemplated as being within the scope of the present disclosure. Furthermore, any of the stages of the graphics processing pipeline 1500 may be implemented by one or more dedicated hardware units within a graphics processor such as parallel processing unit 900. Other stages of the graphics processing pipeline 1500 may be implemented by programmable hardware units such as the streaming multiprocessor 1200 of the parallel processing unit 900.

The graphics processing pipeline 1500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 900. The API provides an abstraction for a programmer that lets a programmer utilize specialized graphics hardware, such as the parallel processing unit 900, to generate the graphical data without requiring the programmer to utilize the specific instruction set for the parallel processing unit 900. The application may include an API call that is routed to the device driver for the parallel processing unit 900. The device driver interprets the API call and performs various operations to respond to the API call. In some instances, the device driver may perform operations by executing instructions on the CPU. In other instances, the device driver may perform operations, at least in part, by launching operations on the parallel processing unit 900 utilizing an input/output interface between the CPU and the parallel processing unit 900. In an embodiment, the device driver is configured to implement the graphics processing pipeline 1500 utilizing the hardware of the parallel processing unit 900.

Various programs may be executed within the parallel processing unit 900 in order to implement the various stages of the graphics processing pipeline 1500. For example, the device driver may launch a kernel on the parallel processing unit 900 to perform the vertex shading 1508 stage on one streaming multiprocessor 1200 (or multiple streaming multiprocessor 1200 modules). The device driver (or the initial kernel executed by the parallel processing unit 900) may also launch other kernels on the parallel processing unit 900 to perform other stages of the graphics processing pipeline 1500, such as the geometry shading 1512 stage and the fragment shading 1518 stage. In addition, some of the stages of the graphics processing pipeline 1500 may be implemented on fixed unit hardware such as a rasterizer or a data assembler implemented within the parallel processing unit 900. It will be appreciated that results from one kernel may be processed by one or more intervening fixed function hardware units before being processed by a subsequent kernel on a streaming multiprocessor 1200.

LISTING OF DRAWING ELEMENTS

100 switching activity estimation
200*a* conventional average power estimation technique
200*b* conventional average power estimation technique
200*c* training method
200*d* inference method
202 gate level simulation
204 gate traces
206 synthesized gate-level netlist
208 power calculation algorithm
210 average power estimates
212 RTL simulation
214 input and register toggle rates
216 synthesized gate-level netlist
218 switching activity estimator
220 power calculation algorithm
222 average power estimates
224 gate level netlist
226 gate level simulation
228 translated to graph objects
230 input and register toggle rates
232 GNN model training
234 per gate toggle rates
236 ground truth toggle rates
238 RTL simulation
240 input and register toggle rates
242 synthesized gate-level netlist
244 translate to a graph object
246 trained GNN model
248 power calculation algorithm
250 average power estimates
300 average power estimation system
302 fully connected layer
304 graph neural network
306 fully connected layer
308 fully connected layer
310 translation logic
400 graph neural network architecture
402 input and register traces
404 estimated gate toggle rates
500 gate-level netlist to node embedding transformation process
502 graph
504 gate-level netlist
600 graph neural network training technique
602 gate level simulations
604 gate-level netlists
606 graph generator
608 graph
610 graph neural network
612 toggle rate labels
614 error function
700 graph neural network average power estimation technique
702 graph neural network based average power estimation system
704 average power estimates
800*a* graph neural network messaging process
800*b* Table II
900 parallel processing unit
902 I/O unit
904 front-end unit
906 hub
908 scheduler unit
910 work distribution unit
912 memory
914 crossbar
916 NVLink
918 interconnect
1000 general processing cluster 1002 pipeline manager
1004 pre-raster operations unit
1006 data processing cluster
1008 raster engine
1010 M-pipe controller
1012 primitive engine
1014 work distribution crossbar
1016 memory management unit
1100 memory partition unit
1102 raster operations unit
1104 level two cache
1106 memory interface
1200 streaming multiprocessor
1202 instruction cache
1204 scheduler unit
1206 dispatch
1208 register file
1210 core
1212 special function unit
1214 load/store unit
1216 interconnect network
1218 shared memory/L1 cache
1300 processing system
1302 parallel processing module
1304 switch
1306 central processing unit
1400 exemplary processing system
1402 main memory
1404 network interface
1406 display devices
1408 input devices
1410 communications bus
1500 graphics processing pipeline
1502 input data
1504 output data
1506 data assembly
1508 vertex shading
1510 primitive assembly
1512 geometry shading
1514 viewport SCC
1516 rasterization
1518 fragment shading
1520 raster operations Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A computer system comprising:
at least one data processor;
a machine memory;
a machine-readable media comprising instructions that, when executed by the at least one data processor, forms in the machine memory a neural network comprising:

a fully-connected input layer configured to transform a netlist, input port toggle rates, and register toggle rates for an electronic circuit into inputs to a graph neural network;

the graph neural network configured to transform a graph of the netlist, the input port toggle rates, and the register toggle rates into first inferred gate toggle rates for combinatorial elements of the electronic circuit in a power window; and at least one fully-connected output layer configured to transform the first inferred gate toggle rates into second inferred gate toggle rates for the combinatorial elements of the electronic circuit.

2. The computer system of claim 1, the machine-readable media further comprising instructions that, when executed by the at least one data processor, transform the second inferred gate toggle rates into average power estimates for the electronic circuit within the power window.

3. The computer system of claim 2, the machine-readable media further comprising instructions that, when executed by the at least one data processor, transform the second inferred gate toggle rates into average power estimates for the electronic circuit within the power window configured to multiply the inferred toggle rates by normalization factors for each gate.

4. The computer system of claim 3, wherein the normalization factors comprises a power that each gate consumes when constantly switching within the power window.

5. The computer system of claim 1, further comprising:

the fully-connected input layer configured to map the input port toggle rates to gate switching activity in the electronic circuit.

6. The computer system of claim 1, wherein the netlist comprises a synthesized gate-level netlist for the electronic circuit.

7. The computer system of claim 6, the machine-readable media further comprising instructions that, when executed by the at least one data processor, transform the gate-level netlist into a graph.

8. The computer system of claim 7, wherein transforming the gate-level netlist into the graph is configured to transform each gate in the gate-level netlist into a node of the graph, and to transform each output-pin-to-net-to-input-pin connection in the gate-level netlist into an edge of the graph.

9. The computer system of claim 8, wherein nodes of the graph comprise switching characteristics of corresponding gates.

10. The computer system of claim 9, wherein the switching characteristics comprise a probability of the corresponding gates to switch high, to switch low, to remain low at their outputs, or to remain high at their outputs during the power window.

11. The computer system of claim 1, further comprising:

an RTL circuit simulator configured to generate the input port toggle rates and register toggle rates for the electronic circuit within the power window.

12. The computer system of claim 1, wherein the input port toggle rates comprise traces of per-clock-cycle input waveforms to the electronic circuit.

* * * * *